United States Patent
Fischer et al.

(10) Patent No.: US 9,037,155 B2
(45) Date of Patent: May 19, 2015

(54) TIME OF ARRIVAL (TOA) ESTIMATION FOR POSITIONING IN A WIRELESS COMMUNICATION NETWORK

(76) Inventors: Sven Fischer, Nuremberg (DE); Muhammad Awais Amin, Nuremberg (DE); Douglas Neal Rowitch, Del Mar, CA (US); Avneesh Agrawal, San Diego, CA (US); Raja S. Bachu, Somerset, NJ (US); Ashwin Sampath, Princeton, NJ (US)

(*) Notice: Subject to any disclaimer, the term of this patent is extended or adjusted under 35 U.S.C. 154(b) by 462 days.

(21) Appl. No.: 12/606,037

(22) Filed: Oct. 26, 2009

(65) Prior Publication Data

US 2010/0279707 A1  Nov. 4, 2010

Related U.S. Application Data

(60) Provisional application No. 61/109,165, filed on Oct. 28, 2008.

(51) Int. Cl.
| | |
|---|---|
| *H04W 24/00* | (2009.01) |
| *G01S 5/14* | (2006.01) |
| *G01S 5/02* | (2010.01) |
| *H04B 7/00* | (2006.01) |
| *H04B 17/00* | (2006.01) |
| *H04W 4/00* | (2009.01) |

(Continued)

(52) U.S. Cl.
CPC . *G01S 5/14* (2013.01); *G01S 5/021* (2013.01); *G01S 5/0221* (2013.01); *G01S 5/0226* (2013.01); *G01S 5/0236* (2013.01)

(58) Field of Classification Search
USPC ........................................... 455/456.1, 67.11
See application file for complete search history.

(56) References Cited

U.S. PATENT DOCUMENTS

| 5,859,612 A | 1/1999 | Gilhousen |
|---|---|---|
| 6,185,429 B1 | 2/2001 | Gehrke et al. |

(Continued)

FOREIGN PATENT DOCUMENTS

| CN | 1288645 A | 3/2001 |
|---|---|---|
| CN | 1454013 A | 11/2003 |

(Continued)

OTHER PUBLICATIONS

International Search Report & Written Report—PCT/US09/062233, International Search Authority—European Patent Office—Mar. 23, 2010.

(Continued)

*Primary Examiner* — Timothy Pham

(57) ABSTRACT

Techniques for determining time of arrivals (TOAs) of signals in a wireless communication network are described. Each cell may transmit (i) synchronization signals on a set of contiguous subcarriers in the center portion of the system bandwidth and (ii) reference signals on different sets of non-contiguous subcarriers distributed across the system bandwidth. A UE may determine TOA for a cell based on multiple signals transmitted on different sets of subcarriers. The UE may perform correlation for a first signal (e.g., a synchronization signal) from the cell to obtain first correlation results for different time offsets. The UE may perform correlation for a second signal (e.g., a reference signal) from the cell to obtain second correlation results for different time offsets. The UE may combine the first and second correlation results and may determine the TOA for the cell based on the combined correlation results.

35 Claims, 9 Drawing Sheets

(51) Int. Cl.
*H04J 3/06* (2006.01)
*G01S 1/00* (2006.01)
*G01S 3/02* (2006.01)
*G01S 1/24* (2006.01)

(56) References Cited

U.S. PATENT DOCUMENTS

| | | |
|---|---|---|
| 6,317,049 B1 | 11/2001 | Toubia et al. |
| 6,317,474 B1* | 11/2001 | Carsello ............... 375/354 |
| 6,445,927 B1* | 9/2002 | King et al. ............ 455/456.6 |
| 6,570,530 B2 | 5/2003 | Gaal et al. |
| 6,714,563 B1 | 3/2004 | Kushi |
| 6,894,644 B2 | 5/2005 | Duffett-Smith et al. |
| 7,233,800 B2 | 6/2007 | Laroia et al. |
| 7,349,366 B2 | 3/2008 | De et al. |
| 7,660,588 B2 | 2/2010 | Sheynblat et al. |
| 7,706,328 B2 | 4/2010 | Mukkavilli et al. |
| 7,729,707 B2 | 6/2010 | Aljadeff et al. |
| 7,813,383 B2 | 10/2010 | Wang et al. |
| 7,817,616 B2 | 10/2010 | Park et al. |
| 7,826,343 B2 | 11/2010 | Krasner |
| 7,893,873 B2 | 2/2011 | Black et al. |
| 7,940,740 B2 | 5/2011 | Krishnamurthy et al. |
| 8,130,657 B2 | 3/2012 | Mosko |
| 8,165,586 B2 | 4/2012 | Krishnamurthy et al. |
| 8,228,923 B1 | 7/2012 | Jain et al. |
| 8,233,432 B2 | 7/2012 | Northcutt et al. |
| 8,289,159 B2 | 10/2012 | Julian et al. |
| 8,326,318 B2 | 12/2012 | Attar et al. |
| 2001/0004601 A1* | 6/2001 | Drane et al. ........... 455/456 |
| 2001/0034238 A1 | 10/2001 | Voyer |
| 2002/0118723 A1* | 8/2002 | McCrady et al. ........ 375/130 |
| 2002/0155845 A1* | 10/2002 | Martorana ............ 455/456 |
| 2003/0036390 A1* | 2/2003 | Villier et al. ......... 455/456 |
| 2003/0119523 A1 | 6/2003 | Bulthuis |
| 2003/0189948 A1 | 10/2003 | Sashihara |
| 2004/0033808 A1 | 2/2004 | Rorabaugh |
| 2004/0052228 A1* | 3/2004 | Tellado et al. ......... 370/334 |
| 2005/0153653 A1 | 7/2005 | Diao et al. |
| 2005/0281247 A1 | 12/2005 | Lim et al. |
| 2006/0125690 A1* | 6/2006 | Goren et al. .......... 342/387 |
| 2006/0160545 A1* | 7/2006 | Goren et al. .......... 455/456.1 |
| 2007/0040703 A1 | 2/2007 | Akkarakaran et al. |
| 2007/0075899 A1 | 4/2007 | Inaba |
| 2007/0121560 A1 | 5/2007 | Edge |
| 2007/0155401 A1 | 7/2007 | Ward et al. |
| 2007/0176826 A1 | 8/2007 | Daniele et al. |
| 2007/0177605 A1 | 8/2007 | Benco et al. |
| 2008/0088507 A1 | 4/2008 | Smith et al. |
| 2008/0125161 A1 | 5/2008 | Ergen et al. |
| 2008/0126161 A1 | 5/2008 | Willis et al. |
| 2008/0132247 A1 | 6/2008 | Anderson |
| 2008/0137691 A1 | 6/2008 | Barry et al. |
| 2008/0232517 A1 | 9/2008 | Terabe et al. |
| 2008/0267304 A1* | 10/2008 | Chong et al. .......... 375/260 |
| 2008/0274750 A1* | 11/2008 | Carlson et al. ......... 455/456.1 |
| 2008/0285505 A1 | 11/2008 | Carlson et al. |
| 2008/0318596 A1 | 12/2008 | Tenny |
| 2009/0034459 A1 | 2/2009 | Shousterman et al. |
| 2009/0097452 A1 | 4/2009 | Gogic |
| 2009/0149169 A1 | 6/2009 | Tanno et al. |
| 2009/0322603 A1 | 12/2009 | Liao |
| 2010/0014443 A1 | 1/2010 | Cristian et al. |
| 2010/0029295 A1 | 2/2010 | Touboul et al. |
| 2010/0054237 A1 | 3/2010 | Han et al. |
| 2010/0074180 A1 | 3/2010 | Palanki et al. |
| 2010/0110983 A1 | 5/2010 | Fu |
| 2010/0118737 A1 | 5/2010 | Kim et al. |
| 2010/0172311 A1 | 7/2010 | Agrawal et al. |
| 2010/0232543 A1 | 9/2010 | Sampath et al. |
| 2010/0260154 A1 | 10/2010 | Frank et al. |
| 2010/0273506 A1 | 10/2010 | Stern-Berkowitz et al. |
| 2010/0322184 A1 | 12/2010 | Xiao |
| 2011/0059752 A1 | 3/2011 | Garin et al. |
| 2011/0103338 A1 | 5/2011 | Astely et al. |
| 2011/0124347 A1 | 5/2011 | Chen et al. |
| 2011/0188438 A1 | 8/2011 | Lee et al. |
| 2011/0237270 A1 | 9/2011 | Noh et al. |
| 2011/0317641 A1 | 12/2011 | Noh et al. |
| 2012/0027110 A1 | 2/2012 | Han et al. |
| 2012/0046047 A1 | 2/2012 | Popovic et al. |
| 2012/0057498 A1 | 3/2012 | Han et al. |
| 2012/0120842 A1 | 5/2012 | Kim et al. |
| 2012/0120903 A1 | 5/2012 | Kim et al. |
| 2012/0120917 A1 | 5/2012 | Shimomura et al. |
| 2012/0165012 A1 | 6/2012 | Fischer et al. |
| 2012/0188129 A1 | 7/2012 | Ameti et al. |
| 2012/0189041 A1 | 7/2012 | Ko et al. |
| 2012/0229337 A1 | 9/2012 | Parker |
| 2014/0071897 A1 | 3/2014 | Palanki et al. |

FOREIGN PATENT DOCUMENTS

| | | |
|---|---|---|
| CN | 1595836 A | 3/2005 |
| CN | 1628488 A | 6/2005 |
| CN | 1826538 A | 8/2006 |
| EP | 1041746 A1 | 10/2000 |
| EP | 1148755 A1 | 10/2001 |
| EP | 1355450 A1 | 10/2003 |
| EP | 1396730 A1 | 3/2004 |
| EP | 1887823 A1 | 2/2008 |
| EP | 1898542 A1 | 3/2008 |
| JP | 2003204573 A | 7/2003 |
| JP | 2003520532 A | 7/2003 |
| JP | 2004101254 A | 4/2004 |
| JP | 2006003187 A | 1/2006 |
| JP | 2007089113 A | 4/2007 |
| JP | 2007533968 A | 11/2007 |
| JP | 2008002866 A | 1/2008 |
| JP | 2008236382 A | 10/2008 |
| JP | 2008236383 A | 10/2008 |
| JP | 2009052948 A | 3/2009 |
| JP | 2010500794 A | 1/2010 |
| JP | 2010525633 A | 7/2010 |
| KR | 100824044 B1 | 4/2008 |
| RU | 2120183 C1 | 10/1998 |
| RU | 2179371 C1 | 2/2002 |
| RU | 2233033 C2 | 7/2004 |
| TW | I223534 B | 11/2004 |
| WO | WO-9427381 A1 | 11/1994 |
| WO | WO-0035117 A2 | 6/2000 |
| WO | WO-0154422 A2 | 7/2001 |
| WO | WO-02071095 | 9/2002 |
| WO | WO-03055272 A1 | 7/2003 |
| WO | WO-2004104621 | 12/2004 |
| WO | WO-2005041602 A1 | 5/2005 |
| WO | WO2005081012 A1 | 9/2005 |
| WO | WO-2006029276 A1 | 3/2006 |
| WO | WO-2006044291 | 4/2006 |
| WO | WO-2006099326 A1 | 9/2006 |
| WO | WO2006109538 A1 | 10/2006 |
| WO | WO-2007120326 A2 | 10/2007 |
| WO | WO-2007127886 A2 | 11/2007 |
| WO | WO-2008073706 A1 | 6/2008 |
| WO | WO2008127185 A1 | 10/2008 |
| WO | WO-2008137607 | 11/2008 |
| WO | WO-2008157841 | 12/2008 |
| WO | WO2009149104 A2 | 12/2009 |
| WO | WO-2010056453 A1 | 5/2010 |

OTHER PUBLICATIONS

Ward P W: "A Design Technique to Remove the Correlation Ambiguity in Binary Offset Carrier (BOC) Spread Spectrum Signals" Proceedings of the Ion National Technical Meeting, The Institute of Navigation, US, Jan. 26, 2004, pp. 886-896, XP001207302 the whole document.

Torrieri D.J., "Statistical Theory of Passive Location Systems," IEEE Transactions on Aerospace and Electronic Systems, Mar. 1984, pp. 183-198, vol. AES-20 (2).

Huawei: "Consideration on positioning support for LTE Rel-9," 3GPP TSG RAN WG1 #56bis, Mar. 23, 2009, R1-091257, pp. 6.

(56) References Cited

OTHER PUBLICATIONS

Motorola: "Frame Structure and Signaling to Support Relay Operation," 3GPP TSG RAN1 #55bis, Jan. 12, 2009, R1-090331, pp. 3.
Taiwan Search Report—TWO98136557—TIPO—Nov. 9, 2012.
"Functional description, Location Services (LCS), Stage 2", (Release 1999) Functional Description, 3GPP TS 03.71 V8.9.0 (Jun. 2004).
"Stage 2 functional specification of User Equipment (UE) positioning in UTRAN" (Release 9) Technical Specification 3GPP TS 25.305 V9.0.0 (Dec. 2009).
3GPP TR 36.942 V8.1.0 (Dec. 2008), 3rd Generation Partnership Project: Technical Specification Group Radio Access Network; Evolved Universal Terrestrial Radio Access (E-UTRA); Radio Frequency (RF) system scenarios; (Release 8), Dec. 2008.
3GPP TS 25.215 V8.2.0 (Sep. 2008), 3rd Generation Partnership Project; Technical Specification Group Radio Access Network: Physical layer—Measurements (MD) (Re ease 8), Sep. 2008.
3GPP TS 25.305 V8.0.0 (Dec. 2007), 3rd Generation Partnership Project; Technical Specification Group Radio Access Network; Stage 2 functional specification of User Equipment (LiE) positioning in UTRAN (t=Zelease 8), Dec. 2007.
Ericsson: "Evaluation of IP-DL Positioning Techniques Using Common Simulation Parameters", TSG-RAN Working Group 1 Meeting 8, Ad Hoc 17, TSGR1#8(99)g88, Manhattan, USA, Oct. 12-Oct. 15, 1999.
Evaluation of Positioning Measurement Systems, Source -, Ericsson, T1 P1.5 8-110, May 15, 1998.
Evaluation parameters for positioning studies, Source: Qualcomm Europe, 3GPP TSG-RAN WG1 #56, R1-090853, Feb. 9-13, 2009, Athens, Greece.
Further positioning evaluations, Source: Qualcomm Europe, 3GPP TSG-RAN WG1 #56, 1 R1-090851—Feb. 9-13, 2009, Athens, Greece.
Motorola: "Impact of Supporting "Blank" Subframes"3GPP TSG RAN Plenary Meeting No. 42 Dec. 5, 2008, XP002589696Athens, Greece Retrieved from the Internet:URL:http://www.3gpp.org/ftp/tsg_ran/tsg_ran/TSGR_42/docs/ [retrieved on Jun. 28, 2010.
PHY layer specification impact of positioning improvements, Source: quatcomm Europe, 3GPP TSG-RAN WG1 #56, R1-090852, Feb. 9-13, '2009, Athens, Greece.
Positioning Support for LTE, 3GPP TSG RAN#42, RP-080995, Dec. 2-5, 2008, Athens, Greece.
Qiang Wu et al: "cdma2000 Highly Detectable Pilot" Communications Workshops, 2008. ICC Workshops "08. IEEE International Conference on, IEEE, Piscataway, NJ, USA, May 19, 2008, pp. 16-20, XP031265196 ISBN: 978-1-4244-2052-0 p. 1, left-hand column, line 8—p. 1, right-hand column, line 31.
Qualcomm Europe: Impact of Blank Subframes on Intrafrequency Measurements'^ GPP TSG-RAN WG4 No. 49 Nov. 6, 2008, XP002589698Prague, CZ Retrieved from the Internet:URL:http://www.3gpp.org/ftp/tsg_ran/wg4_radio/TSGR4_49/Documents/ [retrie.
Qualcomm Europe: "Way forward on forward compatible subframes for Rel-8"3GPP TSG RAN Plenary Meeting No. 42 Dec. 5, 2008 XP002589697Athens, Greece Retrieved from the Internet:URL:http://www.3gpp.org/ftp/tsg^ran/tsg_ran/TSGR_42/docs/ [re.
Qualcomm Europoe "On OTDOA in LTE" 3GPP Draft R1-090353, 3rd Generation Partnership Porject (3GPP) Mobile Competence Centre, 650, Rout Des Lucioles F-06921 Sophia-Antipolis Cedex France No Ljubljana Jan. 8, 2009.
Recapitulation of the iP-DL positioning method, Source: Encsson, TSG-RAN Working Group 1 meeting #4 TSGR1#4 (99)346, Apr. 18-20, 1999, Shin-Yokohama, Japan.
Time Aligned iP-DL positioning technique, Source: Motorola, TSG-RAN Working Group 1, Ah Hoc 17, TSGR1#: 9 b79, Meeting 7, Aug. 30-Sep. 3, 1999, Hannover, Germany.
Greenstein, et al., "A New Path—Gam/Delay—Spread Propagation Model for Digital Cellular Channels", IEEE Transactions on Vehicular Technology, vol. 46, No. 2, op. 477-485, May 1997.
Jun Xiao et al: "Research of TDOA Based Self-localization Approach in Wireless Sensor Network", Intelligent Robots and Systems, 2006 IEEE/RSJ International Conference on, IEEE, PI, Oct. 1, 2006, pp. 2035-2040, XP031006391, ISBN: 978-1-4244-0258-8.
Patwari et al., "Relative Location Estimation in Wireless Sensor Networks", IEEE Transactions on Signal Processing, vol. 51, No. 8, Aug. 2003.
Y,T, Chan and K. Ho, "A Simple and Efficient Estimator for Hyperbolic Location", IEEE Trans. Signal Processing, vol. 42, No. 5, pp. 1905-1915, Aug. 1994.
Nardi S., et al., "GPS estimation algorithm using stochastic modeling", Decision and Control, 1998, Proceedings of the 37th IEEE Conference on Tampa, FL, USA Dec. 16-18, 1998, Piscataway, NJ, USA ,IEEE, US, vol. 4, Dec. 16, 1998, pp. 4498-4502, XP010643396, DOI: 10.1109/CDC.1998.762029, ISBN: 978-0/7803-4394-8.
Pachter M., et al., "An Efficient GPS Postion Determination Algorithm", Navigation, Institute of Navigation, Fairfax, VA, US, vol. 50, No. 2, Sep. 1, 2003, pp. 131-142, XP056004432, 1SSN: 0028-1522.
Sato G., et al., "Improvement of the Positioning Accuracy of a Software-Based GPS Receiver Using a 32-Bit Embedded Microprocessor", IEEE Transactions on Consumer Electronics, IEEE Service Center, NewYork, NY, US, vol. 46, No. 3, Aug. 1, 2000, pp. 521-530, ISSN: 0098-3063, XP001142876, DOI: 10.1109/30.883405.

* cited by examiner

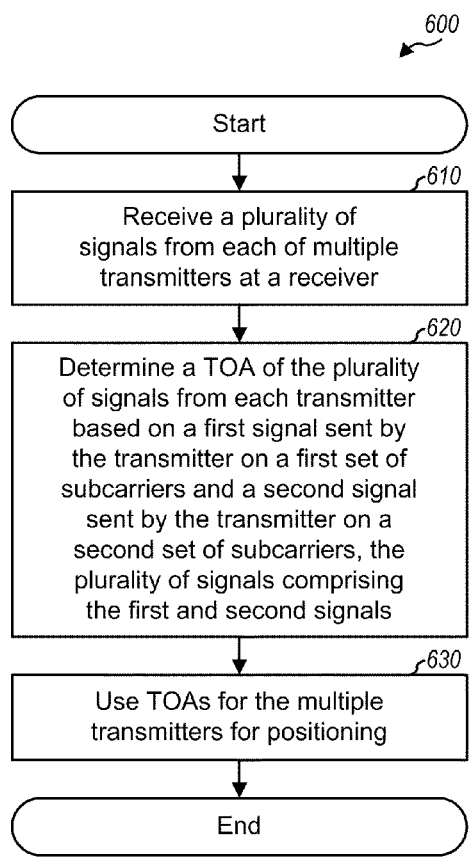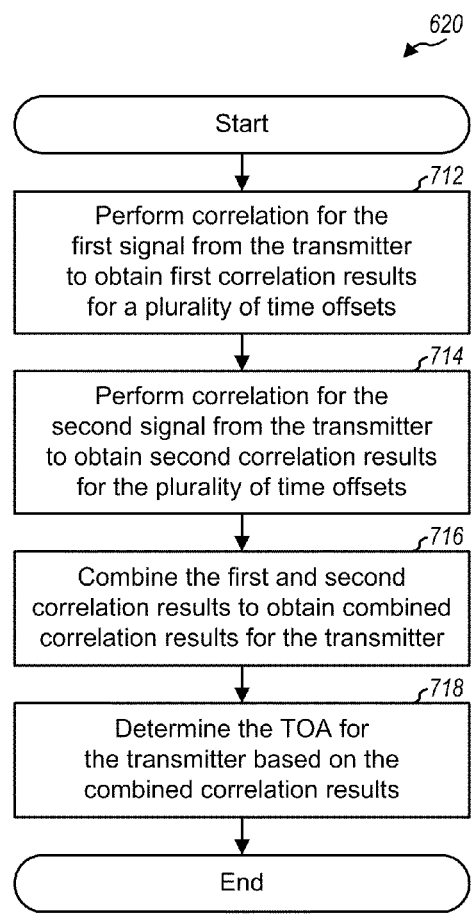
FIG. 6
FIG. 7

TIME OF ARRIVAL (TOA) ESTIMATION FOR POSITIONING IN A WIRELESS COMMUNICATION NETWORK

CLAIM OF PRIORITY UNDER 35 U.S.C. §119

The present Application for Patent claims priority to Provisional U.S. Application Ser. No. 61/109,165, entitled "Time of Arrival Estimation for Position Location," filed Oct. 28, 2008, assigned to the assignee hereof, and expressly incorporated herein by reference.

BACKGROUND

I. Field

The present disclosure relates generally to communication, and more specifically to techniques for estimating time of arrival (TOA) of signals in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may transmit various signals on the downlink to support communication with UEs. Some of the signals may be known a priori by the UEs and may be used for various purposes such as cell detection, channel estimation, timing adjustment, frequency correction, etc. Different signals may have different characteristics to provide good performance for the intended uses of these signals.

SUMMARY

Techniques for determining TOAs of signals in a wireless communication network are described herein. In one design, each cell in the wireless network may transmit a primary synchronization signal and a secondary synchronization signal on a set of contiguous subcarriers in the center portion of the system bandwidth. Each cell may also transmit first and second reference signals on different sets of non-contiguous subcarriers distributed across the system bandwidth.

In an aspect, a TOA for a cell at a UE (or some other entity) may be determined based on multiple signals transmitted by the cell on different sets of subcarriers. In one design, the TOA for the cell may be determined based on a reference signal transmitted on a set of non-contiguous subcarriers and a synchronization signal transmitted on a set of contiguous subcarriers. In another design, the TOA for the cell may be determined based on a first reference signal transmitted on a first set of non-contiguous subcarriers and a second reference signal transmitted on a second set of non-contiguous subcarriers. In yet another design, the TOA for the cell may be determined based on the first and second reference signals and the primary and secondary synchronization signals. In general, the TOA for the cell may be determined based on any number of signals, and each signal may be transmitted on a set of contiguous or non-contiguous subcarriers. The TOA for the cell may be more accurately estimated using multiple signals transmitted on different sets of subcarriers, as described below. This may improve the accuracy of a location estimate or a relative time difference (RTD) determined based on the TOA.

In one design, a UE may perform correlation for a first signal (e.g., a synchronization signal) from a cell to obtain first correlation results for a plurality of time offsets. The UE may perform correlation for a second signal (e.g., a reference signal) from the cell to obtain second correlation results for the plurality of time offsets. The UE may also perform correlation for each of one or more additional signals from the cell to obtain correlation results for the signal. The UE may combine the first and second correlation results (and possibly correlation results for additional signals) to obtain combined correlation results for the cell. The UE may determine the TOA for the cell based on the combined correlation results. The UE may determine TOAs for multiple cells, which may be used to determine a location estimate for the UE.

Various aspects and features of the disclosure are described in further detail below.

BRIEF DESCRIPTION OF THE DRAWINGS

FIG. 6 shows a process for determining TOAs for positioning.
FIG. 7 shows a process for determining TOA for one transmitter.

DETAILED DESCRIPTION

Figure 1:
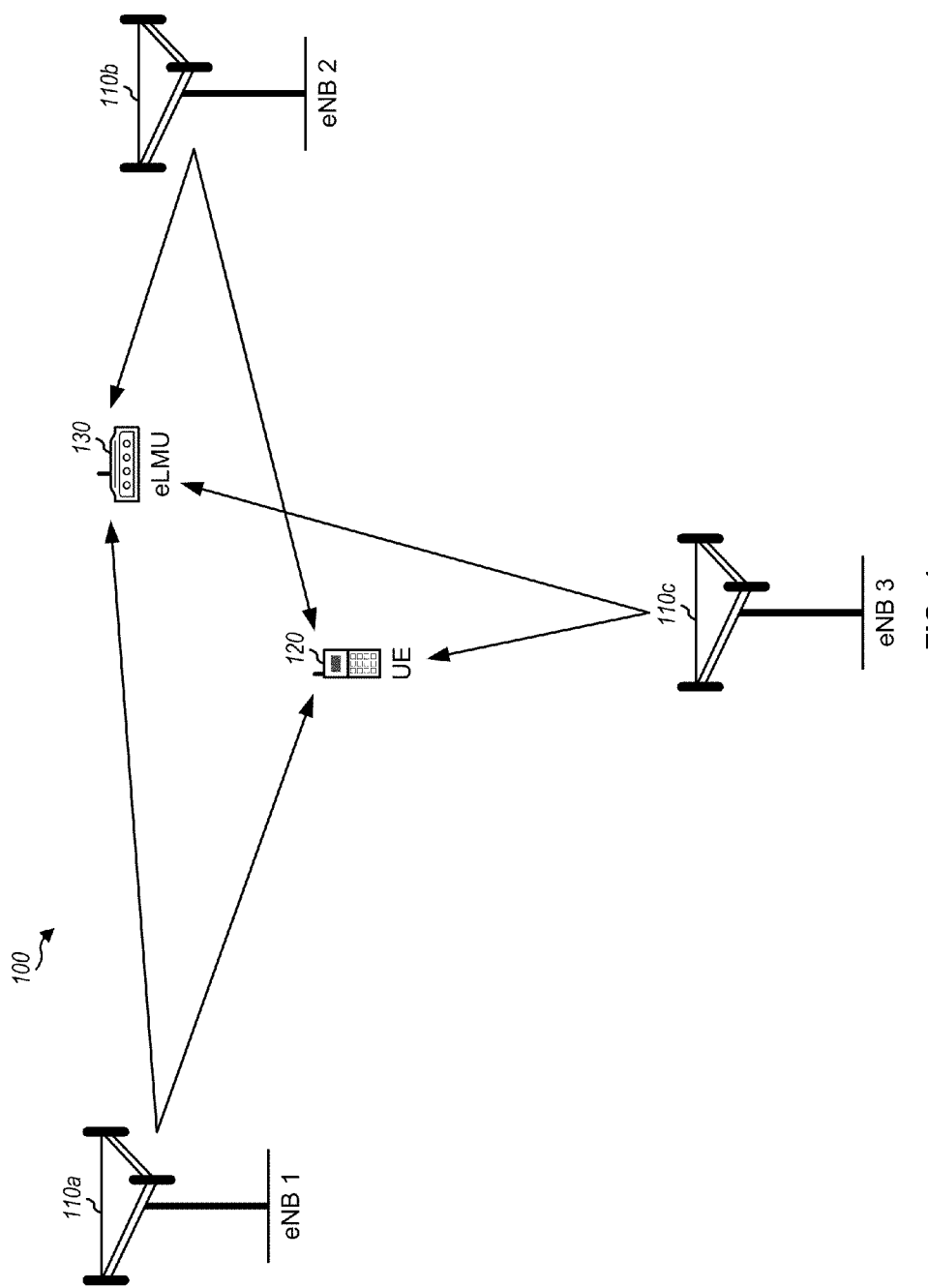
FIG. 1 shows a wireless communication network.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below FIG. 1 shows a wireless communication network 100, which may be an Evolved Universal Terrestrial Radio Access Network (E-UTRAN) in LTE or some other wireless network. Wireless network 100 may include a number of evolved Node Bs (eNBs) and other network entities. For simplicity, only three eNBs 110a, 110b and 110c and one evolved Location Measurement Unit (eLMU) 130 are shown in FIG. 1. An eNB may be a station that communicates with the UEs and may also be referred to as a Node B, a base station, an access point, a femtocell, etc. Each eNB 110 may provide communication coverage for a particular geographic area. The overall coverage area of an eNB may be partitioned into multiple smaller areas, and each smaller area may be served by a respective eNB subsystem. In 3GPP, the term "cell" can refer to a coverage area of an eNB and/or an eNB subsystem serving this coverage area. In 3GPP2, the term "sector" or "cell-sector" can refer to a coverage area of a base station and/or a base station subsystem serving this coverage area. For clarity, 3GPP concept of cell is used in the description below. An eNB may serve one or multiple (e.g., three) cells.

Wireless network 100 may support synchronous or asynchronous operation. For synchronous operation, the eNBs may have their timing aligned to a common time source and may transmit their signals at approximately the same time. The common time source may be from the United States Global Positioning System (GPS), the European Galileo system, the Russian GLONASS system, or some other navigation satellite system (NSS). For asynchronous operation, the eNBs may have different timing, and the signals from different eNBs may not be aligned in time. The techniques described herein may be used for both synchronous and asynchronous networks.

eLMU 130 may be deployed at a known location and may measure TOAs of signals from different cells. The TOAs and the known location of eLMU 130 may be used to determine RTDs between different cells, as described below. The RTDs may be used for positioning of UEs in an asynchronous network. eLMU 130 may be a standalone element (as shown in FIG. 1) or may be integrated in an eNB. eLMU 130 may communicate with the network via one or more wireless or wireline communication links, e.g., to report its measurements to a network entity, to receive measurement instructions from a network entity, etc. eLMU 130 may obtain measurements for TOAs for various cells, RTDs for various pairs of cells, quality estimates for the measurements, etc. eLMU 130 may report its measurements to a location server in the network. The location server may be a Serving Mobile Location Center (SMLC), an evolved SMLC (eSMLC), a Gateway Mobile Location Center (GMLC), a Position Determination Entity (PDE), a Standalone SMLC (SAS), a Secure User Plane Location (SUPL) Location Platform (SLP), etc. eLMU 130 may report the measurements on demand, periodically, or on modification (e.g., when the measurement quantity changed by a certain amount compared to the previous measurement report). A network entity (e.g., an eSMLC, etc.) may store the eLMU measurements in a database (e.g., in a Base Station Almanac) together with other information (e.g., eNB locations, eNB radio parameters, eNB cell IDs, etc.) to be used for positioning of a target UE or for provision of assistance data to a UE, as described below.

A number of UEs may be dispersed throughout wireless network 100, and each UE may be stationary or mobile. For simplicity, FIG. 1 shows only one UE 120. A UE may also be referred to as a terminal, a mobile station (MS), a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tracking device, etc. A UE may communicate with an eNB via the downlink and uplink. The downlink (or forward link) refers to the communication link from the eNB to the UE, and the uplink (or reverse link) refers to the communication link from the UE to the eNB. FIG. 1 shows downlink transmissions from eNBs 110a, 110b and 110c to UE 120. Uplink transmissions from the UE to the eNBs are not shown in FIG. 1.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing between adjacent subcarriers may be 15 KHz, and K may be equal to 83, 166, 333, 666 or 1333 for system bandwidth of 1.25, 2.5, 5, 10 or 20 MHz, respectively.

Figure 2:
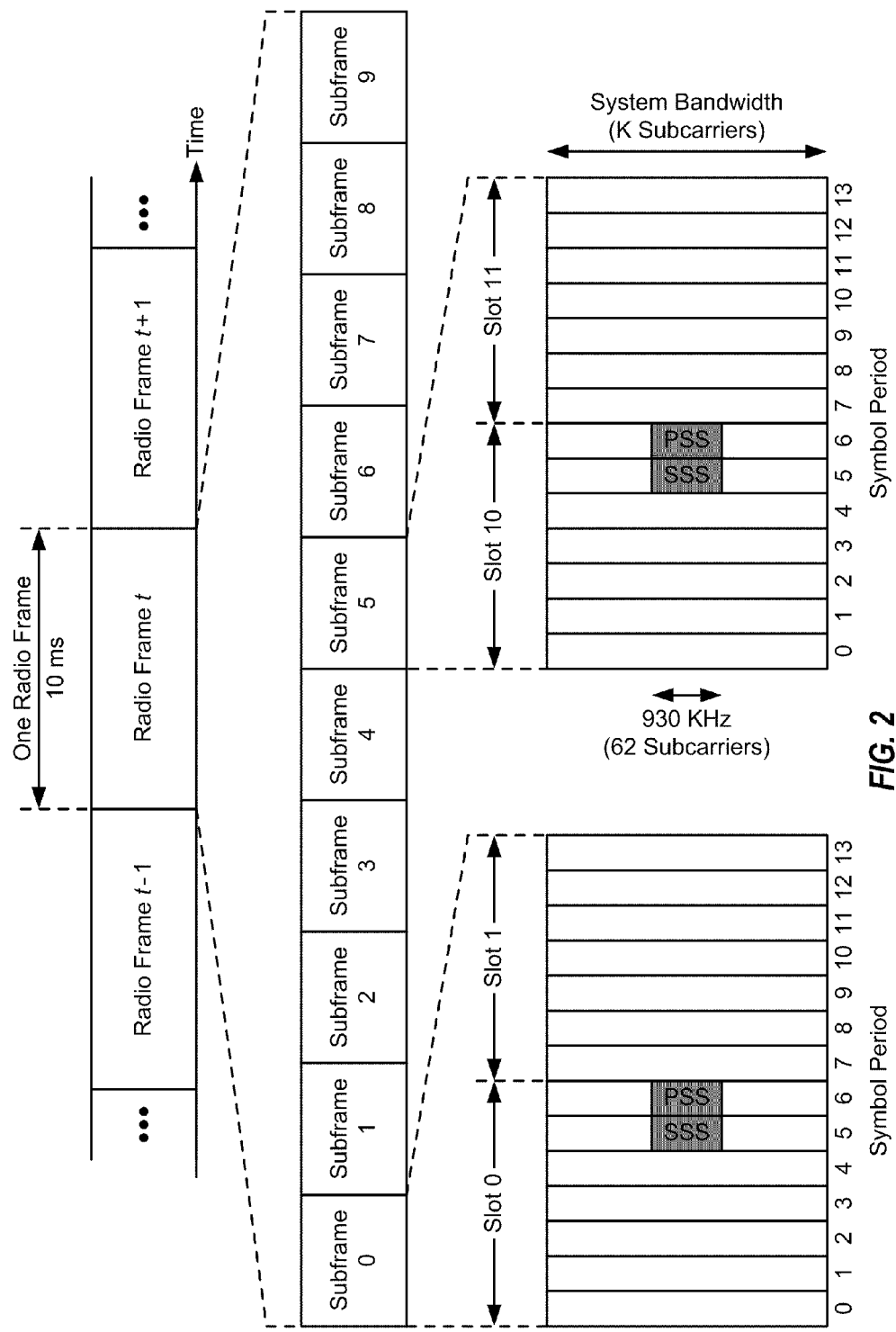
FIG. 2 shows an exemplary frame structure.

FIG. 2 shows a frame structure in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1.

In LTE, each eNB may periodically transmit a primary synchronization signal (PSS) and a secondary synchronization signal (SSS) for each cell in that eNB. The primary and secondary synchronization signals may be sent in symbol periods 6 and 5, respectively, in subframes 0 and 5 of each radio frame with the normal cyclic prefix, as shown in FIG. 2. The UEs may search for the primary and secondary synchronization signals to detect for cells and may obtain information such as cell identity (ID), timing, and frequency offset of the detected cells. Each eNB may also periodically transmit reference signals for each cell in that eNB. The UEs may use the reference signals from the detected cells for various functions such as channel estimation, signal strength measurement, signal quality measurement, etc.

In LTE, each cell may be assigned a cell ID, which may be given as:

$$N_{ID}^{cell} = 3 \cdot N_{ID}^{(1)} + N_{ID}^{(2)}. \quad \text{Eq (1)}$$

where $N_{ID}^{cell} \in \{0, \ldots, 503\}$ is the cell ID, $N_{ID}^{(1)} \in \{0, \ldots, 167\}$ is an index of a cell ID group to which the cell ID belongs, and $N_{ID}^{(2)} \in \{0, 1, 2\}$ is an index of a specific ID within the cell ID group.

The primary and secondary synchronization signals for each cell may be generated based on $N_{ID}^{(1)}$ and $N_{ID}^{(2)}$ for the cell.

An eNB may generate a primary synchronization signal for a cell as follows.

The eNB may first generate a sequence $d_{PSS}(n)$ of 62 complex values based on a Zadoff-Chu sequence and $N_{ID}^{(2)}$ for the cell. The eNB may map the 62 complex values in $d_{PSS}(n)$ to 62 subcarriers in the center of the system bandwidth, as shown in FIG. 2. The eNB may map zero symbols with signal value of zero to the remaining subcarriers. The eNB may then generate an OFDM symbol with the primary synchronization signal sent on the center 62 subcarriers. To generate the OFDM symbol, the eNB may (i) perform an $N_{FFT}$-point fast Fourier transform (FFT) on $N_{FFT}$ mapped symbols to obtain $N_{FFT}$ time-domain samples for a useful portion and (ii) copy the last C samples of the useful portion and append these samples to the front of the useful portion to obtain the OFDM symbol comprising $N_{FFT}+C$ samples. C is the length of a cyclic prefix used to combat frequency selective fading caused by multipath in a wireless channel. The eNB may transmit the OFDM symbol in each symbol period in which the primary synchronization signal is sent.

The eNB may generate a secondary synchronization signal for the cell as follows. The eNB may first generate a sequence $d_{SSS}(n)$ of 62 complex values based on scrambling and pseudo-random number (PN) sequences as well as $N_{ID}^{(1)}$ and $N_{ID}^{(2)}$ for the cell. The eNB may map the 62 complex values in $d_{SSS}(n)$ to 62 subcarriers in the center of the system bandwidth, as shown in FIG. 2. The eNB may map zero symbols to the remaining subcarriers and may generate an OFDM symbol with the secondary synchronization signal sent on the center 62 subcarriers. The eNB may transmit the OFDM symbol in each symbol period in which the secondary synchronization signal is sent. The primary and secondary synchronization signals in LTE are described in 3GPP TS 36.211, entitled "Evolved Universal Terrestrial Radio Access (E-UTRA); Physical Channels and Modulation," which is publicly available.

A UE may perform cell search to detect for cells. The UE may detect for primary synchronization signals in the first step of the cell search. The UE can ascertain symbol timing and obtain $N_{ID}^{(2)}$ from each detected primary synchronization signal. The UE may then detect for the secondary synchronization signal for each detected primary synchronization signal in the second step of the cell search. The UE can ascertain frame timing and obtain $N_{ID}^{(1)}$ from each detected secondary synchronization signal.

Figure 3:
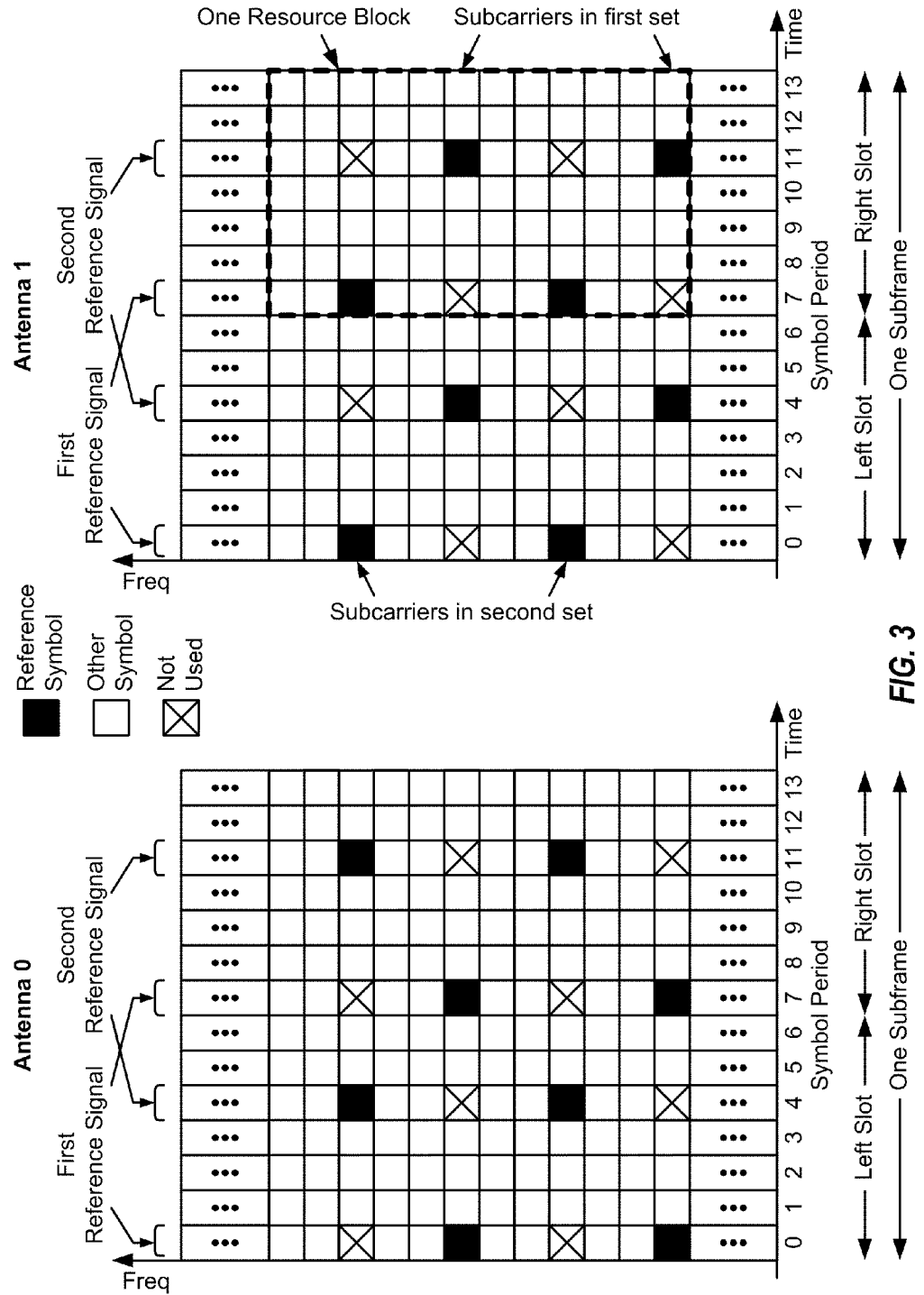
FIG. 3 shows an exemplary subframe format.

FIG. 3 shows a subframe format in LTE. The available time frequency resources may be partitioned into resource blocks. In LTE, each resource block covers 12 subcarriers in one slot and includes a number of resource elements. Each resource element covers one subcarrier in one symbol period and may be used to send one symbol, which may be a real or complex value.

The subframe format shown in FIG. 3 may be used by an eNB with two antennas. A cell-specific reference signal may be sent in each of symbol periods 0, 4, 7 and 11 of a subframe for the normal cyclic prefix. A reference signal is a signal that is known a priori by a transmitter and a receiver and may also be referred to as pilot, etc. A cell-specific reference signal is a reference signal that is specific for a cell, e.g., generated with one or more sequences determined based on the cell ID. A cell-specific reference signal may also be referred to as a common reference signal, common pilot, etc. For simplicity, a cell-specific reference signal is referred to as a reference signal in much of the description below.

For antenna 0, a first reference signal may be sent on a first set of subcarriers in the first symbol period of each slot. A second reference signal may be sent on a second set of carriers in the fifth symbol period of each slot with the normal cyclic prefix. Each set may include subcarriers that are spaced apart by six subcarriers. The subcarriers in the first set may be offset from the subcarriers in the second set by three subcarriers. For antenna 1, a first reference signal may be sent on the second set of subcarriers in the first symbol period of each slot. A second reference signal may be sent on the first set of subcarriers in the fifth symbol period of each slot with the normal cyclic prefix. In FIG. 3, resource elements used for the reference signals are shown with black fill, and resource elements used for other transmissions are shown with white fill. Resource elements used for reference signals by a given antenna are not used for transmission by other antennas. For each antenna, the resource elements not used for transmission by that antenna are shown with cross hash.

An eNB may generate a reference signal for a cell as follows. The eNB may first generate a sequence $d_{RS}(n)$ of Q complex values based on a PN sequence and $N_{ID}^{cell}$ for the cell, where Q is dependent on the total number of subcarriers (K). The eNB may map the Q complex values in $d_{RS}(n)$ to Q subcarriers uniformly distributed across the system bandwidth and spaced apart by six subcarriers, as shown in FIG. 3. The specific subcarriers to use for the reference signal may be determined by the cell ID. Different cells with different cell IDs may use different subcarriers for their reference signals. The eNB may map other symbols (e.g., data symbols, control symbols, zero symbols, etc.) on the remaining subcarriers and may generate an OFDM symbol with the reference signal sent on the Q non-contiguous subcarriers. The eNB may transmit the OFDM symbol in each symbol period in which the reference signal is sent.

The eNB may generate the first and second reference signals for each slot in similar manner. Sequence $d_{RS}(n)$ may be a function of slot index as well as symbol period index and may thus be different for different reference signals. Different subcarriers may also be used for the first and second reference signals, as shown in FIG. 3. The OFDM symbol for the first reference signal may thus be different from the OFDM symbol for the second reference signal, even if the remaining subcarriers are filled with zero symbols. The reference signals in LTE are described in the aforementioned 3GPP TS 36.211.

The synchronization signals and the reference signals from each cell are known by the UEs and may be used for positioning. Positioning refers to a functionality that determines a geographical location of a target device, e.g., a UE. The synchronization signals may be sent in two symbol periods every 5 ms, as shown in FIG. 2. Furthermore, the synchronization signals may be sent in the center 930 KHz of the system bandwidth to allow all UEs to receive these signals regardless of their bandwidth capability. The reference signals may be sent in two symbol periods of each slot, as shown in FIG. 3. Furthermore, the reference signals may be sent on non-contiguous subcarriers distributed across the system bandwidth to allow UEs to derive a channel estimate for the entire system bandwidth.

A UE may determine the TOAs of synchronization signals and/or reference signals from cells that have been detected by the UE. The TOAs for different cells and their known locations may be used to derive a location estimate for the UE, as described below.

The UE may determine the TOA of a synchronization signal (e.g., a primary or secondary synchronization signal) from a given cell m as follows. The UE may locally generate a sample sequence $d_{SS,m}(n)$ for an OFDM symbol comprising the synchronization signal in similar manner as cell m. The UE may correlate its received samples r(n) with the locally generated sample sequence $d_{SS,m}(n)$ in the time domain, as follows:

$$S_{SS,m}(k) = \sum_{n=0}^{L-1} r^*(n) \cdot d_{SS,m}(n+k), \qquad \text{Eq (2)}$$

where L is the number of samples in the sample sequence, e.g., $L=N_{FFT}+C$, and $S_{SS,m}(k)$ is a correlation result for the synchronization signal from cell m for time offset k.

The UE may obtain a correlation result for each time offset within a search window. The width of the search window may be dependent on the size of the cell, which may define the minimum and maximum TOAs. For example, the center of the serving cell may be used as a coarse location estimate for the UE. The expected TOAs for each neighbor cell may be predicted using the known location of the cells by calculating the distance between each neighbor cell and the coarse location estimate for the UE. Since the true UE location can be anywhere within the coverage area of the serving cell, a minimum and maximum expected TOA for each neighbor cell may be determined by the shortest and longest distances between the cell edges of the serving cell and each neighbor cell, respectively. If the network operates in asynchronous mode, then the RTDs may be taken into account when predicting expected TOAs and search window sizes. The expected TOAs and search window calculations may be performed by a network entity (e.g., an eSMLC, etc.) and provided as assistance data to the UE. Alternatively, the UE may perform these calculations using information about neighbor cell locations and RTDs (if applicable), which may be provided to the UE in assistance data or may be available from other sources (e.g., cell broadcast information). The center of the search window may be placed at an expected TOA.

In one design, the UE may compare the squared magnitude of the correlation result for each time offset against a threshold $S_{TH}$. The UE may declare a detected synchronization signal if the following condition is satisfied:

$$|S_{SS,m}(k)|^2 > S_{TH}. \quad \text{Eq (3)}$$

In other designs, the UE may compare the magnitude, the absolute value, or some other metric of the correlation result against a suitable threshold. In one design, the threshold $S_{TH}$ may be a fixed value. In another design, the threshold $S_{TH}$ may be a configurable value that may be set to a particular percentage of the energy of the received samples. For both designs, the threshold may be selected based on a trade off between detection probability and false alarm probability. A higher threshold may reduce both detection probability and false alarm probability, and vice versa.

The UE may correlate the received samples with the locally generated sequence for each time offset as shown in equation (2) and may compare the correlation result against the threshold as shown in equation (3). The UE may determine the earliest time offset with the correlation result exceeding the threshold and may provide this time offset as the TOA of the synchronization signal from cell m at the UE. This TOA estimate may be given with sampling period resolution. The UE may perform interpolation to obtain a TOA estimate with a finer time resolution. For example, the TOA estimate obtained with sampling period resolution may be interpolated using neighbor sampling points in accordance with parabolic, cubic, and/or other interpolation functions known in the art. Additional adjustments may be applied to the interpolated TOA estimate to compensate for known biases between a transmitted pulse shape and a selected interpolating function.

The UE may determine the TOA of a reference signal from cell m as follows. The UE may locally generate a sample sequence $d_{RS,ms}(n)$ for an OFDM symbol comprising the reference signal from cell m. In one design, the sample sequence generated locally by the UE may include zero symbols on subcarriers not used for the reference signal whereas the OFDM symbol generated by cell m may comprise non-zero symbols on the subcarriers not used for the reference signal. The non-zero symbols sent by cell m may then act as noise.

The UE may correlate its received samples r(n) with the locally generated sequence $d_{RS,m}(n)$ in the time domain for different time offsets, e.g., as shown in equation (2). The UE may compare the squared magnitude or some other metric of the correlation result for each time offset against a threshold, e.g., as shown in equation (3). The UE may provide the earliest time offset with the correlation result exceeding the threshold as the TOA of the reference signal from cell m at the UE. The UE may also perform interpolation and bias compensation to obtain a more accurate TOA estimate. For example, interpolation may be performed on at least two combined correlation results, including the combined correlation result for the identified time offset, to obtain an interpolated time offset, and the TOA may be determined for the transmitter based on the interpolated time offset. Determining the TOA for the transmitter based on the interpolated time offset may include determining the TOA for the transmitter based further on an adjustment to account for known biases between a transmitted pulse shape and an interpolating function.

Equation (2) shows correlation of the received samples with a locally generated sample sequence for one OFDM symbol. The received samples may be noisy, and the correlation results may also be noisy. In one design, the correlation results for different OFDM symbols may be coherently combined, as follows:

$$S_{CC,m}(k) = \sum_l S_{m,l}(k), \quad \text{Eq (4)}$$

where $S_{m,l}(k)$ is a correlation result for time offset k in OFDM symbol l, and $S_{CC,m}(k)$ is a coherently combined correlation result for time offset k.

In another design, the correlation results for different OFDM symbols may be non-coherently combined, as follows:

$$S_{NC,m}(k) = \sum_l |S_{m,l}(k)|^2, \quad \text{Eq (5)}$$

where $S_{NC,m}(k)$ is a non-coherently combined correlation result for time offset k.

As shown in equation (4), coherent combining sums complex values such that the phases of the complex values affect the result. As shown in equation (5), non-coherent combining sums real values for energies. Coherent and non-coherent combining may be used to average the noise and improve accuracy of the correlation results. Coherent combining may provide better performance but may be limited to situations in which the wireless channel does not changed noticeably, to avoid combining complex values with large phase difference. Non-coherent combining may be used for all situations.

The correlation of the received samples with a locally generated sample sequence may be defined by a correlation function. The correlation function may assume ideal received samples with no noise and only known symbols for a synchronization signal or a reference signal (e.g., zero symbols on subcarriers not used for the synchronization signal or the reference signal). The correlation function for a synchronization signal or a reference signal for a single propagation path may be expressed as:

$$|R(t)| = \frac{(T_{SYM} - |t|)\sin\left(\pi P\left(\left\lfloor\frac{U-1}{P}\right\rfloor + 1\right)\Delta f t\right)}{N_{FFT}\Delta f \sin(\pi P \Delta f t)}, \quad \text{Eq (6)}$$

where $T_{SYM}$ is the duration (in seconds) of one OFDM symbol,
- t is a temporal lag around a correlation peak, with $-T_{SYM} \leq t \leq T_{SYM}$,
- $\Delta f$ is the spacing between subcarriers, e.g., $\Delta f=15$ KHz in LTE,
- $N_{FFT}$ is the FFT length, e.g., $N_{FFT}=512$ for 5 MHz system bandwidth in LTE,
- U is the total number subcarriers used for the synchronization or reference signal,
- P is the spacing between subcarriers used for the synchronization or reference signal (in number of subcarriers), and
- |R(t)| is a normalized correlation value for the synchronization or reference signal.

For example, for a synchronization signal, U=62 and P=1. For example, for a reference signal, U=301 for 5 MHz system bandwidth and P=6. The other parameters are the same for both the synchronization signals and the reference signals.

The correlation function has peaks at values of t that make the denominator of equation (6) equal to zero. These values of t may be expressed as:

$$t = \frac{i}{P\Delta f}, \quad \text{for } i = 1, 2, \ldots \quad \text{Eq (7)}$$

Figure 4A:
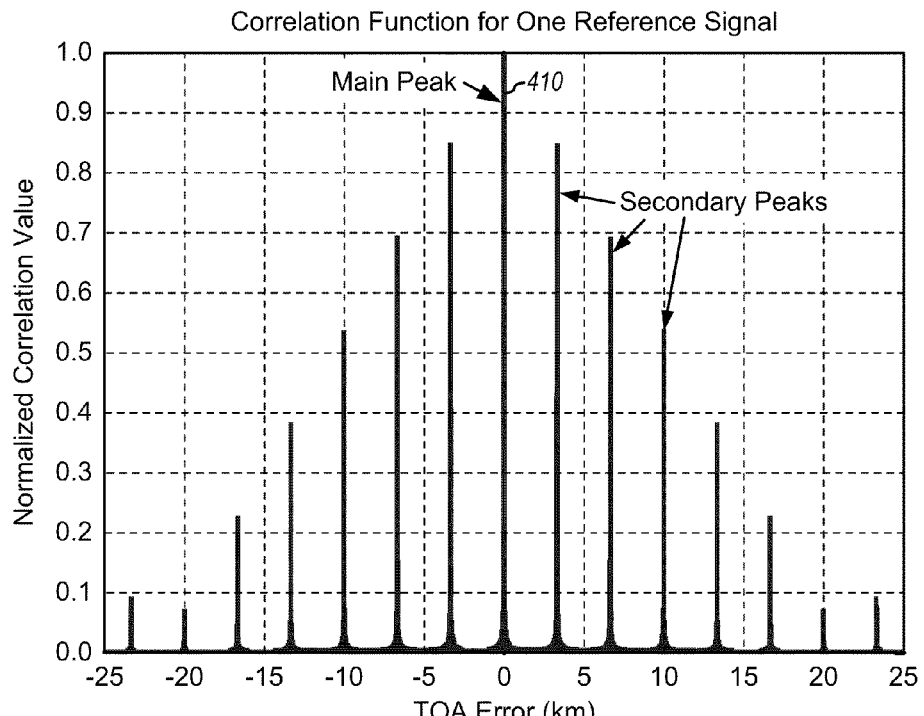
FIGS. 4A to 4F show plots of correlation functions for synchronization signals and reference signals.

FIG. 4A shows a plot 410 of the correlation function for a reference signal transmitted in one OFDM symbol. The horizontal axis shows TOA error in units of kilometers (km), and the vertical axis shows normalized correlation value. As shown in FIG. 4A, the correlation function for the reference signal has a main peak at zero TOA error and secondary peaks every 3.3 km. The secondary peaks are due to undersampling in the frequency domain, with every sixth subcarrier being used for the reference signal, as shown in FIG. 3.

Figure 4B:
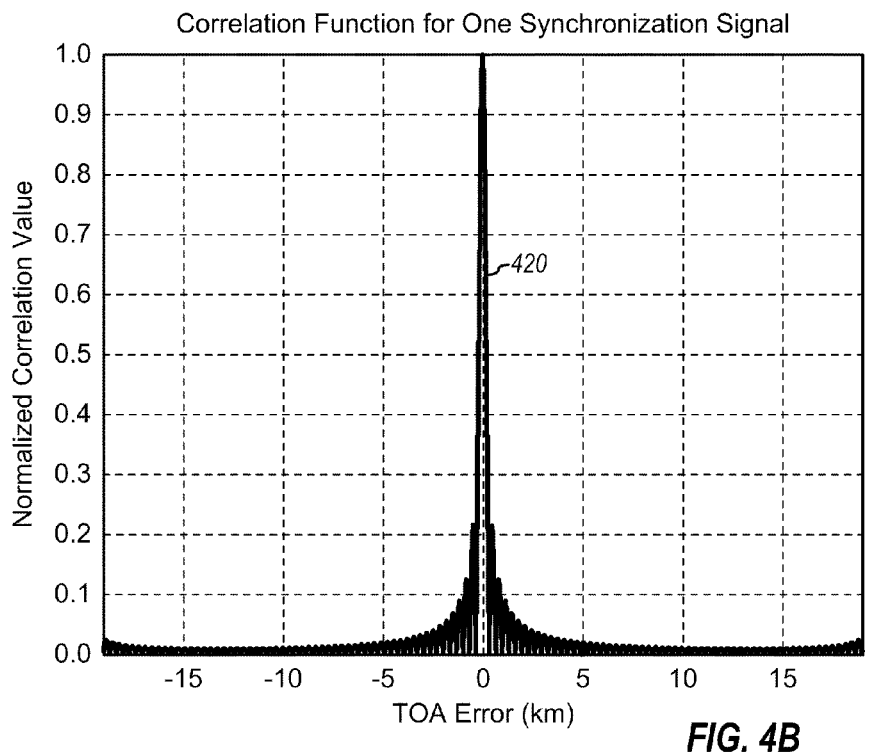

FIG. 4B shows a plot 420 of the correlation function for a synchronization signal transmitted in one OFDM symbol. As shown in FIG. 4B, the correlation function for the synchronization signal has a single main peak at zero TOA error and no secondary peaks.

Figure 4C:
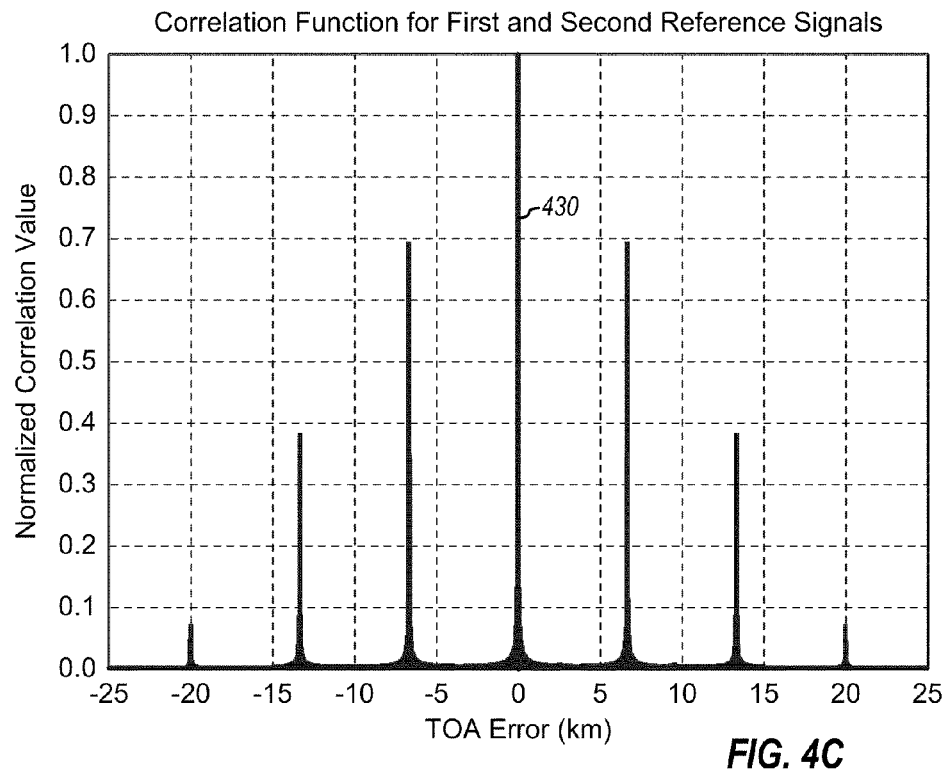
Figure 4D:
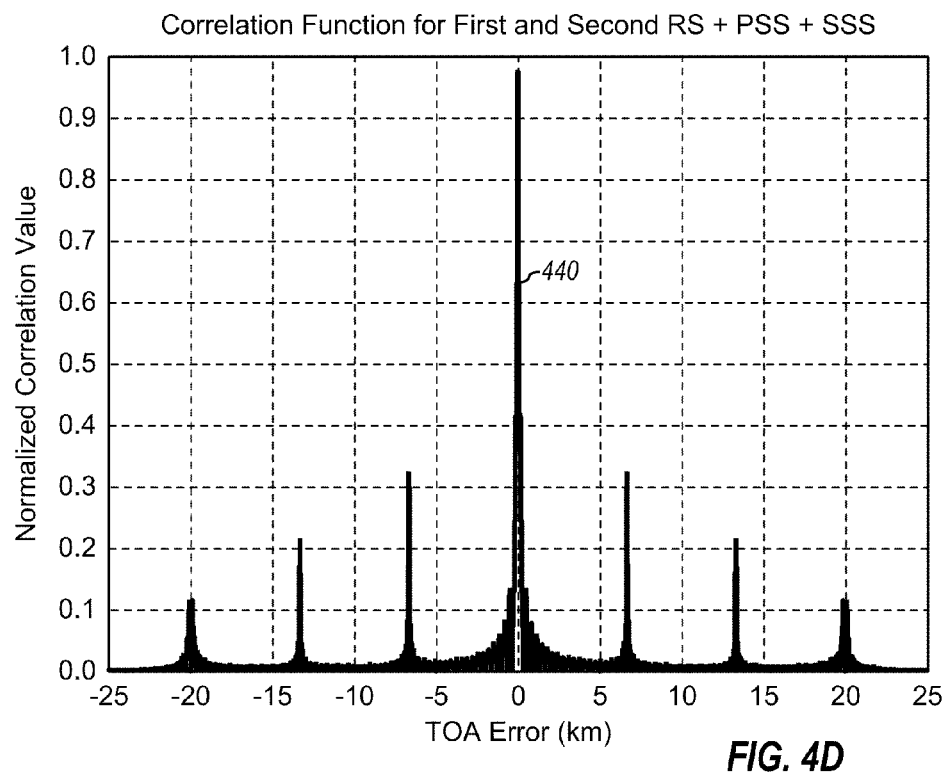
Figure 4E:
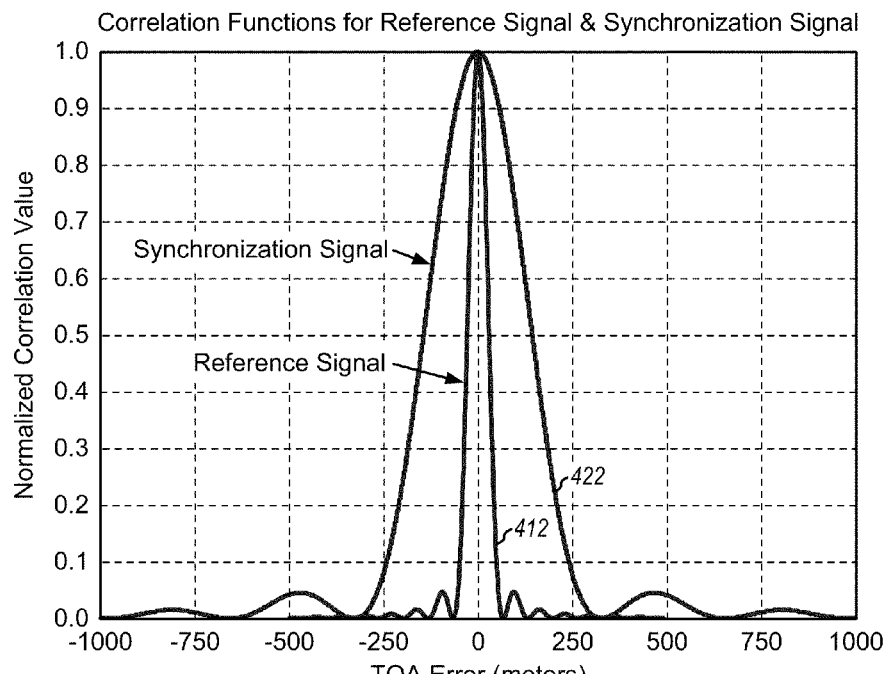

FIG. 4E shows a zoom-in plot 412 of the main peak of the correlation function for the reference signal for 5 MHz system bandwidth. FIG. 4E also shows a plot 422 of the main peak of the correlation function for the synchronization signal. The width of the main peak for each signal is determined by the bandwidth of the signal. For 5 MHz system bandwidth, the bandwidth of the reference signal may be more than four times the bandwidth of the synchronization signal. The width of the main peak for the reference signal would then be more than four times more narrow than the width of the main peak for the synchronization signal, as shown in FIG. 4E.

In LTE, the bandwidth of the synchronization signal is fixed at 930 KHz regardless of the system bandwidth. The width of the main peak for the synchronization signal may be fixed and shown by plot 422 in FIG. 4E. The bandwidth of the reference signal may be dependent on the system bandwidth and may be variable from 1.25 MHz to 20 MHz. The width of the main peak for the reference signal may be progressively more narrow as the system bandwidth progressively increases from 1.25 MHz to 20 MHz.

The width of the main peak for each signal determines the time resolution of the correlation function for that signal. A TOA estimator that performs correlation may be considered as a matched filter. The TOA estimator may be able to resolve two multipath components if $\Delta\tau B_e > 1$, where $\Delta\tau$ is the time difference between two propagation paths, and $B_e$ is the equivalent bandwidth of the signal. Graphically, the TOA estimator may be able to resolve multipath components that are closer together if the main peak is more narrow. Hence, it may be desirable to use a reference signal (instead of a synchronization signal) for TOA estimation due to a potentially more narrow main peak for the reference signal. However, the reference signal has secondary peaks, as shown in FIG. 4A, which may result in an erroneous TOA if the correlation window is not properly placed or if the correlation search window is too large so that multiple peaks fall within the correlation window (e.g., if the cell sizes are too large) and the correlation results are too noisy.

In summary, the synchronization signals may have the following characteristics:
- Unambiguous correlation function with no secondary peaks,
- Transmitted infrequently in two OFDM symbols every 5 ms, and
- Occupy the center 62 subcarriers independent of the system bandwidth.

The reference signals may have the following characteristics:
- Ambiguous correlation function with secondary peaks,
- Transmitted frequently in two OFDM symbols every slot of 0.5 ms, and
- Higher system bandwidth gives more energy and narrower main peak.

In an aspect, ambiguity in the correlation of a reference signal may be reduced by coherently combining correlation results for the first and second reference signals sent on two sets of subcarriers. This may effectively reduce the subcarrier spacing P in half, from six subcarriers down to three subcarriers. The secondary peaks may then occur every 6.6 km (instead of every 3.3 km).

Correlation for two reference signals transmitted by a given cell m on two sets of subcarriers may be performed as follows:
1. Perform correlation for the first reference signal by correlating the received samples with a first locally generated sample sequence for the first reference signal at different time offsets k and obtain correlation results $S_{RS1,m}(k)$, e.g., as shown in equation (2),
2. Perform correlation for the second reference signal by correlating the received samples with a second locally generated sample sequence for the second reference signal at different time offsets k and obtain correlation results $S_{RS2,m}(k)$,
3. Coherently combine the correlation results for the first and second reference signals for different time offsets, e.g., $S_{RS,m}(k)=S_{RS1,m}(k)+S_{RS2,m}(k)$, and
4. Compare the combined correlation result $S_{RS,m}(k)$ against a threshold and provide the earliest time offset with the combined correlation result exceeding the threshold as the TOA of the reference signals from cell m at the UE.

FIG. 4C shows a plot 430 of a correlation function for the first and second reference signals transmitted in two OFDM symbols of one slot. As shown in FIG. 4C, the correlation function has a main peak at zero TOA error and secondary peaks every 6.6 km. The secondary peaks are due to under-sampling in the frequency domain, with every third subcarrier being used for the two reference signals. The inter-peak distance with two reference signals is increased by a factor of two versus the inter-peak distance with one reference signal. Hence, the search window sizes (e.g., cell sizes) can be larger in this case.

Coherently combining the correlation results for two reference signals may increase the inter-peak distance. However, the secondary peaks are still present and may result in an erroneous TOA; for example, if the correlation window is not properly placed, or the correlation results are too noisy.

In another aspect, a narrow main peak and attenuated secondary peaks may be obtained by coherently combining correlation results for a reference signal with correlation results for a synchronization signal. The narrow main peak may be obtained by using the reference signal. The secondary peaks from the reference signal may be attenuated by using the synchronization signal. Coherently combining the two signals may provide the advantage of the narrow main peak with less adverse effects due to the secondary peaks.

In general, correlation results for any number of synchronization signals and any number of reference signals may be coherently combined. In one design, correlation results for one synchronization signal and one reference signal may be coherently combined. In another design, correlation results for the primary and secondary synchronization signals and the first and second reference signals transmitted in one slot may be coherently combined. In another design, correlation results for all synchronization signals and all reference signals transmitted in one subframe may be coherently combined. Correlation results for other combinations of synchronization signals and reference signals may also be coherently combined. Coherent combining may be limited to the coherence time of the wireless channel.

For simplicity, much of the description herein assumes correlation (and hence coherent accumulation) across all active subcarriers in each symbol period. In general, coherent combining across subcarriers may be limited to the coherence bandwidth of the communication channel. Coherent combining over a wider bandwidth may result in similar degradation as coherent combining too long in time (i.e., integration beyond the coherence time of the communication channel). If the coherence bandwidth is smaller than the signal bandwidth, then the signal bandwidth may be partitioned into multiple (L) portions, where L≥(signal bandwidth/coherence bandwidth). Coherent combining may be performed for each portion, and non-coherent combining may be performed for the L portions. Correlation results may thus be non-coherently combined across frequency and/or time to obtain the final peak energies.

Correlation for the primary and secondary synchronization signals and the first and second reference signals transmitted in one slot by a given cell m may be performed as follows:

1. Perform correlation for the primary synchronization signal by correlating the received samples with a first locally generated sample sequence for the primary synchronization signal at different time offsets k and obtain correlation results $S_{PSS,m}(k)$ e.g., as shown in equation (2),
2. Perform correlation for the secondary synchronization signal by correlating the received samples with a second locally generated sample sequence for the secondary synchronization signal at different time offsets k and obtain correlation results $S_{SSS,m}(k)$,
3. Perform correlation for the first reference signal at different time offsets and obtain correlation results $S_{RS1,m}(k)$,
4. Perform correlation for the second reference signal at different time offsets and obtain correlation results $S_{RS2,m}(k)$,
5. Coherently combine the correlation results for the primary and secondary synchronization signals and the first and second reference signals, e.g., $S_m(k)=S_{RS1,m}(k)+S_{RS2,m}(k)+S_{PSS,m}(k)+S_{SSS,m}(k)$, and
6. Compare the combined correlation result $S_m(k)$ against a threshold and provide the earliest time offset with the combined correlation result exceeding the threshold as the TOA of the signals from cell m at the UE.

Correlation results for the synchronization signals and the reference signals may also be non-coherently combined (instead of coherently combined).

FIG. 4D shows a plot 440 of a correlation function for the primary and secondary synchronization signals and the first and second reference signals transmitted in one slot. As shown in FIG. 4D, the correlation function has a main peak at zero TOA error and secondary peaks every 6.6 km. However, the secondary peaks are attenuated relative to the secondary peaks shown in FIG. 4C due to the use of the synchronization signals.

Figure 4F:
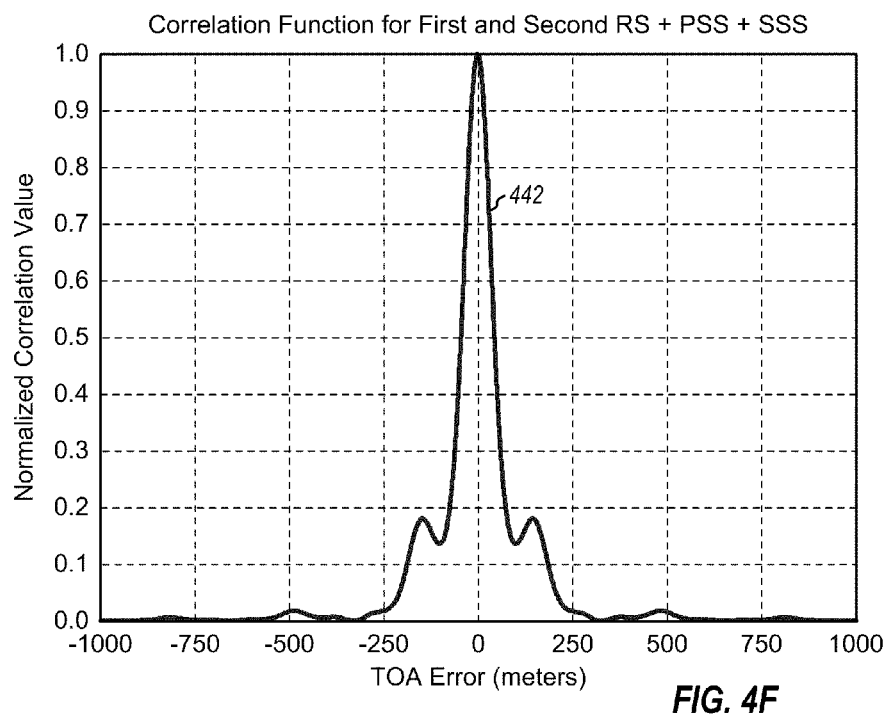

FIG. 4F shows a zoom-in plot 442 of the main peak of the correlation function shown in FIG. 4D. The width of the main peak in plot 442 is approximately equal to the width of the main peak for the reference signal in plot 412 in FIG. 4E.

A UE may perform correlation with locally generated sample sequences in the time domain, as described above. In another design, the UE may perform correlation in the frequency domain. In yet another design, the received samples may be transformed to the frequency domain to obtain received symbols for all K total subcarriers. Received symbols on subcarriers not used for the synchronization signals or the reference signals may be replaced with zero symbols. The received symbols and zero symbols may be transformed back to the time domain to obtain input samples. Correlation may then be performed on the input samples instead of the received samples. Correlation may also be performed in other manners.

Regardless of how correlation may be performed, the UE may coherently and/or non-coherently combine correlation results. In general, the UE may coherently combine correlation results across any suitable time interval. The time interval may be limited by the coherence time of the wireless channel, which may in turn be dependent on the UE mobility. The UE may coherently combine correlation results across a slot, a subframe, a frame, etc. The UE may also non-coherently combine correlation results across different time intervals to further improve accuracy.

In one design, the UE may coherently combine correlation results across OFDM symbols in each slot. For each slot, the UE may perform correlation for all synchronization signals and reference signals transmitted in that slot and may obtain correlation results for the slot. The UE may then non-coherently combine correlation results across slots, e.g., as shown in equation (5).

For simplicity, the description above is for correlation for one transmit antenna at an eNB. The eNB may transmit synchronization signals and reference signals from multiple transmit antennas. For each antenna, the eNB may transmit reference signals on resource elements reserved for the reference signals for that antenna, e.g., as shown in FIG. 3. The UE may perform correlation for each antenna, as described above, and obtain correlation results for the antenna. For each antenna, the UE may locally generate a sample sequence for each signal with known symbols mapped to the proper subcarriers. The UE may then perform correlation for each signal with the locally generated sample sequence for that signal. For each antenna, the UE may coherently combine correlation results for different signals across a suitable time interval. The UE may then non-coherently combine correlation results for different antennas to obtain accumulated correlation results for all antennas. The UE may further non-coherently combine the accumulated correlation results across different time intervals to further improve accuracy.

For example, in case of two transmit antennas at an eNB and one or more receive antennas at the UE, the signal received at each receive antenna is the sum of the transmit signals after propagation through the wireless channel. The composite signal at each receive antenna may be correlated coherently against locally generated sample sequences, one sequence at a time, for the reference signals transmitted from the two transmit antennas. The two correlation results for the two transmit antennas may then be summed non-coherently, effectively doubling the number of non-coherent accumulations. If two receive antennas are available at the UE, then the correlation results for the two receive antennas may be added non-coherently. Thus, for a given total observation time, the effective number of non-coherent sums in a 2×1 or 1×2 system may be twice that of a 1×1 system, where a T×R system denotes T transmit antennas and R receive antennas. In a 2×2 MIMO system, the number of non-coherent sums may be four times that of the 1×1 system. Other ways of combining correlation results from multiple transmit and/or multiple receive antennas may also be possible.

In one design, the UE may be provided with assistance data to facilitate TOA measurements for different cells or to perform position calculation by the UE using the TOA measurements. In one design, the UE may be provided with assistance data comprising one or more of the following:

Cell IDs of neighbor cells—used to (i) locally generate sample sequences for synchronization signals and reference signals used for correlation and (ii) determine the subcarriers used for the reference signals, Carrier frequency information—useful if neighbor cells operate on other frequency bands, Cyclic prefix length (e.g., normal or extended cyclic prefix)—used to locally generate sample sequences, Number of transmit antennas—used to determine the number of correlations to perform, Coarse or fine RTD for neighbor cells—useful for an asynchronous network, Cell location—useful for UE-based positioning methods, and Search window size—determine the number of time offsets to perform correlation.

The UE may also be provided with other assistance data that may be useful for TOA measurements and/or position calculation. Some or all of the assistance data may be provided to the UE via dedicated signaling or via a broadcast channel. The neighbor cell IDs for TOA measurements may be selected by the assistance data source (e.g., an eSMLC, etc.) in such a way that good measurement geometry for position calculation may be obtained if the UE is measuring all or a subset of the neighbor cells provided by the assistance data.

The UE may determine TOAs for at least three cells in different eNBs. The UE location may then be estimated based on the TOAs using an Observed Time Different of Arrival (OTDOA) positioning method.

Figure 5:
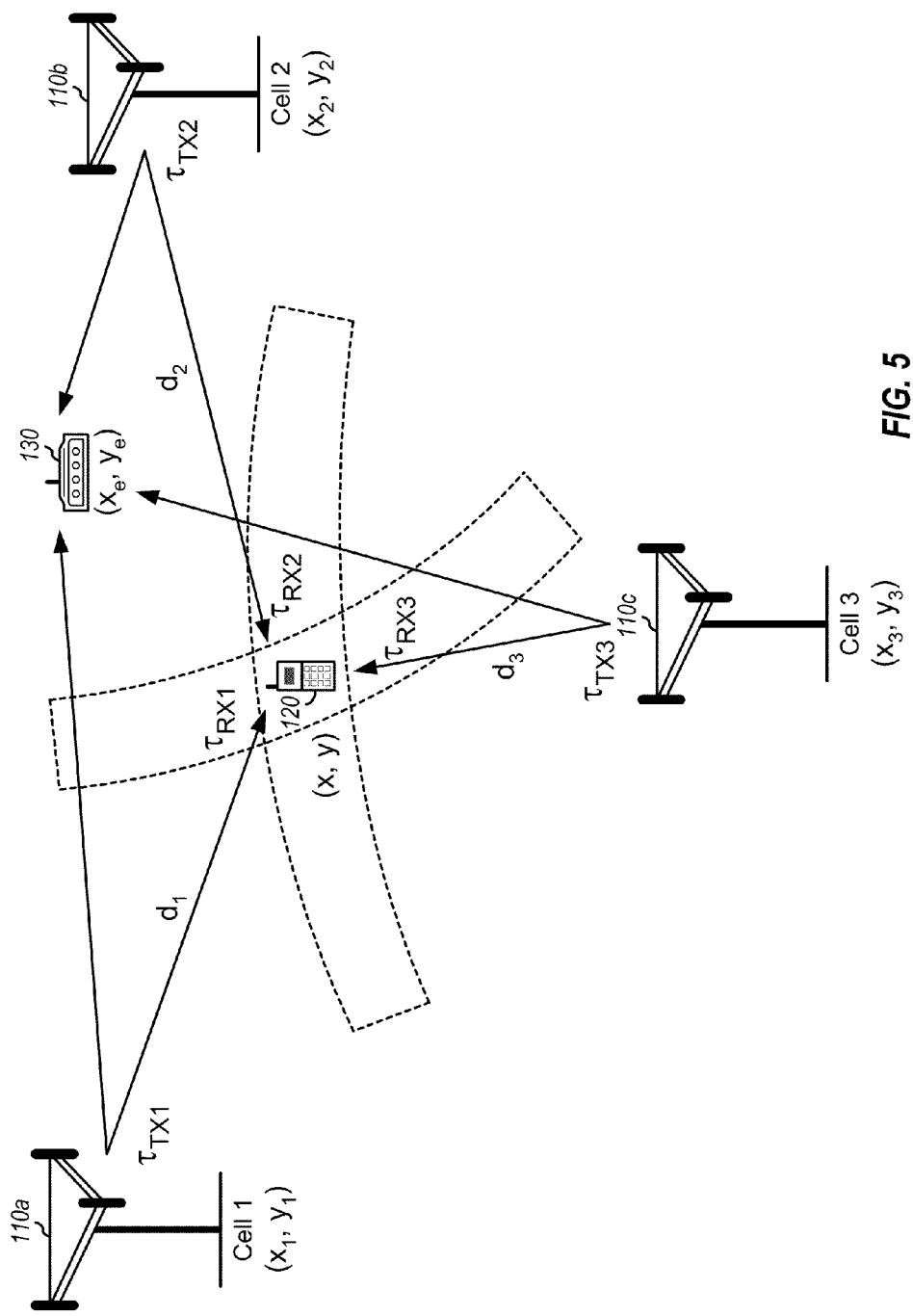
FIG. 5 shows positioning for a UE.

FIG. 5 shows positioning for UE 120 based on OTDOA. The UE may receive synchronization signals and reference signals from three cells 1, 2 and 3 in eNBs 110a, 110b and 110c, respectively. Cell 1 may transmit its signals with a transmit time of $\tau_{TX1}$, cell 2 may transmit its signals with a transmit time of $\tau_{TX2}$, and cell 3 may transmit its signals with a transmit time of $\tau_{TX3}$. The transmit times $\tau_{TX1}$, $\tau_{TX2}$ and $\tau_{TX3}$ may be similar in a synchronous network and may be different in an asynchronous network. The UE may determine the TOAs of the signals from cells 1, 2 and 3, e.g., by performing correlation for the synchronization signals and the reference signals from each cell, as described above. The UE may obtain a TOA of $\tau_{RX1}$ for cell 1, a TOA of $\tau_{RX2}$ for cell 2, and a TOA of $\tau_{RX3}$ for cell 3.

Cell 1 may be used as a reference cell. Two hyperbolic TDOA equations may be expressed as:

$$\tau_{RX2}-\tau_{RX1}=(\tau_{TX2}-\tau_{TX1})+(d_2-d_1)/c, \text{ and} \quad\quad \text{Eq (8a)}$$

$$\tau_{RX3}-\tau_{RX1}=(\tau_{TX3}-\tau_{TX1})+(d_3-d_1)/c, \quad\quad \text{Eq(8b)}$$

where $d_1$, $d_2$ and $d_3$ are distances from cells 1, 2 and 3 to the UE, and c is the speed of light.

Equation set (8) may be expressed in terms of the UE location, as follows:

$$\tau_{RX21}=\tau_{TX21}+(\sqrt{(x_2-x)^2+(y_2-y)^2}-\sqrt{(x_1-x)^2+(y_1-y)^2})/c, \text{ and} \quad\quad \text{Eq (9a)}$$

$$\tau_{RX31}=\tau_{TX31}+(\sqrt{(x_3-x)^2+(y_3-y)^2}-\sqrt{(x_1-x)^2+(y_1-y)^2})/c, \quad\quad \text{Eq (9b)}$$

where $(x_1, y_1)$, $(x_2, y_2)$ and $(x_3, y_3)$ are the locations of cell 1, 2 and 3, respectively, (x, y) is the location of the UE, $\tau_{RX21}=\tau_{RX2}-\tau_{RX1}$ is a time difference of arrival (TDOA) between cells 2 and 1, $\tau_{RX31}=\tau_{RX3}-\tau_{RX1}$ is a TDOA between cells 3 and 1.

$\tau_{TX21}=\tau_{TX2}-\tau_{TX1}$ is an RTD between cells 2 and 1, and $\tau_{TX31}=\tau_{TX3}-\tau_{TX1}$ is an RTD between cells 3 and 1.

TDOA is also referred to as observed time difference (OTD).

For a synchronous network, the RTDs $\tau_{TX21}$ and $\tau_{TX31}$ may be assumed to be zero. The TDOAs $\tau_{RX21}$ and $\tau_{RX31}$ may be computed based on the TOAs for cells 1, 2 and 3. The locations of cells 1, 2 and 3 may be known. For an asynchronous network, the RTDs $\tau_{TX21}$ and $\tau_{TX31}$ may be non-zero and may be determined by eLMU 130. For both synchronous and asynchronous networks, the UE location (x, y) may be determined based on equation set (9) using all of the known parameters. The computation may be performed by the UE for UE-based positioning or by a network entity (e.g., an eSMLC, etc.) for UE-assisted positioning.

eLMU 130 may determine the TOAs of synchronization signals and/or reference signals from cells in a similar manner as described above for the UE. The TOAs for different cells and their known locations together with the known eLMU location may be used to derive RTD estimates, which may be used to derive a location estimate for the UE in an asynchronous network. In particular, eLMU 130 may determine RTDs for different pairs of cells based on equation set (9). eLMU 130 may obtain TOAs for cells 1, 2 and 3, e.g., by performing correlation for the synchronization signals and/or the reference signals for each cell, as described above. The TDOAs $\tau_{RX21}$ and $\tau_{RX31}$ may be computed based on the TOAs for cells 1, 2 and 3. The location of eLMU 130 and the locations of cells 1, 2 and 3 may be known. The RTDs $\tau_{TX21}$ and $\tau_{TX31}$ may then be determined based on equation set (9) using all of the known parameters.

In another design, eLMU 130 may obtain TOAs for cells, e.g., by performing correlation for the synchronization signals and the reference signals for a cell, as described above. eLMU 130 may associate (e.g., time-stamp) these TOAs with some absolute time base (e.g., GPS system time, Galileo system time, GLONASS system time, etc.). RTDs for different pairs of cells may then be obtained by forming absolute time differences. Such a design may be preferable if eLMUs are integrated in each eNB, since for such an eLMU, it may be difficult to receive sufficient neighbor eNB signals for determining RTDs directly (e.g., the strong signal from the eNB may block the reception of signals from neighbor eNBs, sometimes referred to as "near-far effect").

FIG. 6 shows a design of a process 600 for determining TOAs for positioning. Process 600 may be performed by a receiver, which may be a UE, an eLMU, or some other entity. The receiver may receive a plurality of signals from each of multiple transmitters (block 610). The plurality of signals from each transmitter may comprise first and second signals, which may be sent in different symbol periods. Each transmitter may be for a cell or some other entity. The receiver may determine a TOA of the plurality of signals from each transmitter based on the first signal sent by the transmitter on a first set of subcarriers and the second signal sent by the transmitter on a second set of subcarriers (block 620). The receiver may use TOAs for the multiple transmitters for positioning (block 630).

In one design, the first signal may comprise a reference signal sent on the first set of non-contiguous subcarriers, and the second signal may comprise a synchronization signal sent on the second set of contiguous subcarriers. The first set may include non-contiguous subcarriers distributed across the system bandwidth. The second set may include contiguous subcarriers in a center portion of the system bandwidth. The first set may include a configurable number of subcarriers determined by the system bandwidth. The second set may include a fixed number of subcarriers independent of the system bandwidth. In one design, the first and second sets may overlap partially and may include at least one subcarrier that is common to both sets. At one extreme, one set may include all subcarriers in the other set plus at least one additional subcarrier. In another design, the first and second sets may be non-overlapping, and each set may include subcarriers not included in the other set. In yet another design, the first and second sets may overlap completely, and both sets may include the same subcarriers.

In another design, the first signal may comprise a first reference signal sent on the first set of non-contiguous subcarriers, and the second signal may comprise a second reference signal sent on the second set of non-contiguous subcarriers. The first and second sets may include different subcarriers, e.g., as shown in FIG. 3. In yet another design, the first and second signals may comprise two reference signals, and the TOA for each transmitter may be determined based further on a synchronization signal sent by the transmitter on a third set of contiguous subcarriers. In yet another design, the first and second signals may comprise two reference signals, and the TOA for each transmitter may be determined based further on a primary synchronization signal and a secondary synchronization signal sent by the transmitter on a third set of contiguous subcarriers. In general, the TOA for each transmitter may be determined based on any number of signals, and each signal may be sent by the transmitter on a set of contiguous or non-contiguous subcarriers.

FIG. 7 shows a design of determining the TOA for one transmitter in block 620 in FIG. 6. The receiver may perform correlation for the first signal from the transmitter to obtain first correlation results for a plurality of time offsets (block 712). The receiver may perform correlation for the second signal from the transmitter to obtain second correlation results for the plurality of time offsets (block 714). For each signal, the receiver may perform correlation across the entire signal bandwidth or across each portion of the signal bandwidth, depending on the signal bandwidth and the coherence bandwidth of the wireless channel. The receiver may also perform correlation for each of one or more additional signals from the transmitter to obtain correlation results for the signal. The receiver may combine the first and second correlation results (and possibly correlation results for other signals) to obtain combined correlation results for the transmitter (block 716). The receiver may determine the TOA for the transmitter based on the combined correlation results (block 718).

In one design of block 712, the receiver may generate a sample sequence with known symbols mapped to the first set of subcarriers used for the first signal. The receiver may then correlate the received samples at the receiver with the sample sequence at each time offset to obtain the first correlation results for the plurality of time offsets. The receiver may also perform correlation for each signal in other manners, as described above.

In one design of block 716, the receiver may coherently combine the first and second correlation results to obtain the combined correlation results for the transmitter. In another design, the receiver may non-coherently combine the first and second correlation results to obtain the combined correlation results. In yet another design, the receiver may coherently combine the first and second correlation results for each time interval to obtain intermediate correlation results for the time interval. The receiver may then non-coherently combine the intermediate correlation results across multiple time intervals to obtain the combined correlation results for the transmitter. In yet another design, the receiver may non-coherently combine the first and second correlation results for different portions of the signal bandwidth in each symbol period. The receiver may then non-coherently combine the correlation results across different symbol periods or time intervals and/or across different parts of the signal bandwidth to obtain the combined correlation results for the transmitter. In yet another design, the receiver may coherently combine the first and second correlation results for each antenna at the transmitter to obtain intermediate correlation results for the antenna. The receiver may then non-coherently combine the intermediate correlation results across multiple antennas at the transmitter to obtain the combined correlation results for the transmitter. In general, the receiver may coherently combine correlation results for any number of signals across a suitable time interval and/or a suitable frequency range. The receiver may non-coherently combine correlation results across different time intervals, frequency ranges, antennas, etc.

In one design of block 718, the receiver may identify the earliest time offset with a combined correlation result exceeding a threshold. The receiver may then provide the identified time offset as the TOA for the transmitter. The receiver may also determine the TOA for the transmitter based on the combined correlation results in other manners.

Referring back to FIG. 6, in one design of block 630, the receiver may determine OTDOAs for multiple pairs of transmitters, one OTDOA for each pair of transmitters. Each OTDOA may be determined based on the TOAs for the transmitters in the corresponding pair. The receiver may compute a location estimate for itself based on the OTDOAs for the multiple pairs of transmitters and the known locations of the transmitters, e.g., as shown in equation set (9). The receiver may obtain assistance data for the multiple transmitters, e.g., RTDs for the transmitters, transmitter locations, etc. The receiver may compute the location estimate using the assistance data In another design, the receiver may send measurement information comprising TOAs for the multiple transmitters (e.g., OTDOAs for pairs of transmitters) to a network entity. The receiver may receive a location estimate for itself from the network entity. The location estimate may be determined based on the TOAs for the multiple transmitters (e.g., the OTDOAs for pairs of transmitters).

In yet another design, the receiver may be for an eLMU. The receiver may determine RTDs for multiple pairs of transmitters, one RTD for each pair of transmitters. Each RTD may be determined based on (i) the TOAs and known locations of the transmitters in the corresponding pair and (ii) the known location of the receiver.

The receiver may receive assistance data for the multiple transmitters, which may be for multiple cells. The assistance data may comprise cell IDs of the cells, locations of the cells, carrier frequency information for the cells, the cyclic prefix length for each cell, the number of transmit antenna for each cell, RTDs for the cells, a search window size, some other information, or any combination thereof The receiver may determine the TOAs for the multiple transmitters using the assistance data.

Figure 8:
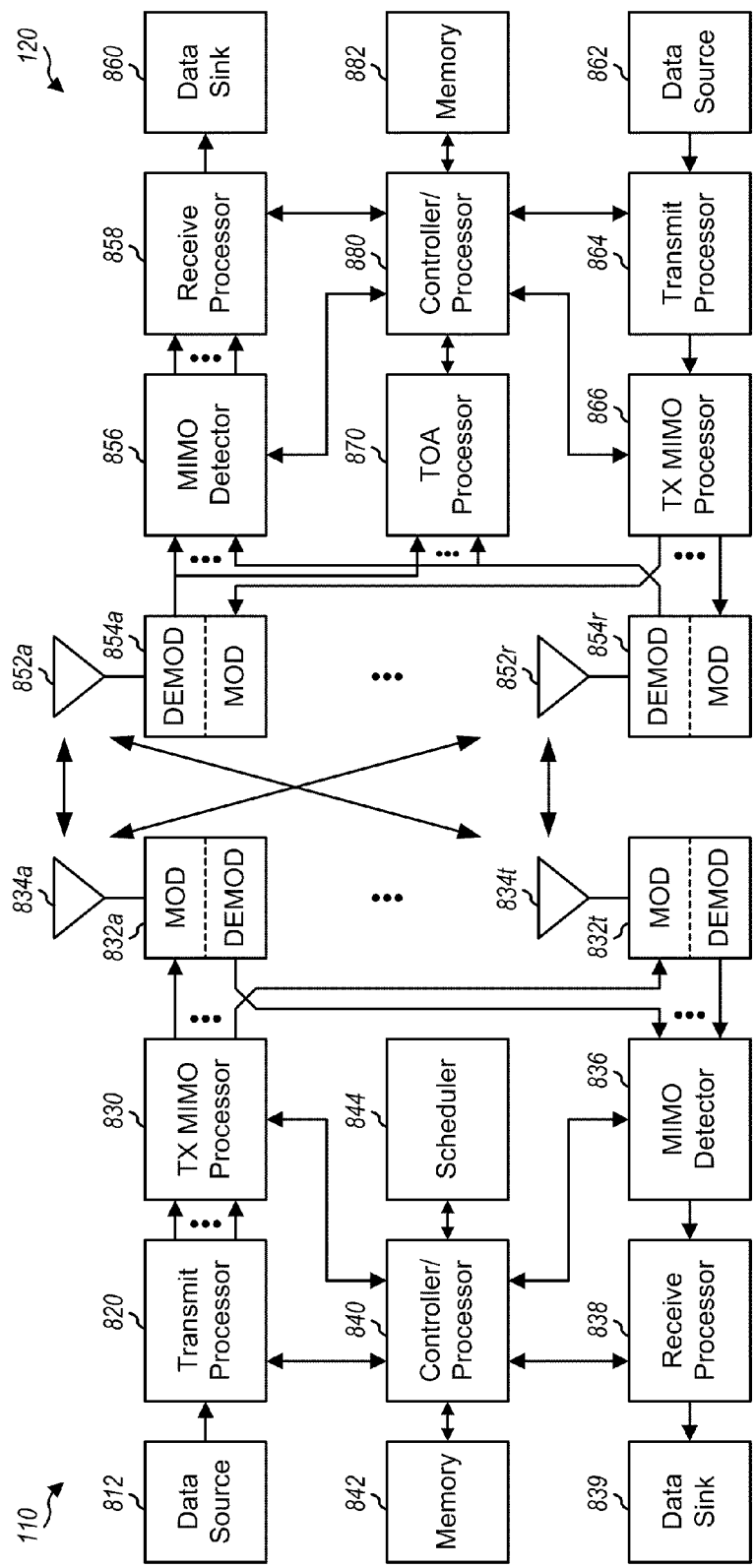
FIG. 8 shows a block diagram of a UE and a base station.

FIG. 8 shows a block diagram of a design of UE 120 and an eNB/base station 110, which may be one of the eNBs/base stations in FIG. 1. eNB 110 may be equipped with T antennas 834a through 834t, and UE 120 may be equipped with R antennas 852a through 852r, where in general T≥1 and R≥1.

At eNB 110, a transmit processor 820 may receive data for one or more UEs from a data source 812, process the data for each UE based on one or more modulation and coding schemes selected for that UE, and provide data symbols for all UEs. Transmit processor 820 may also process control information (e.g., for assistance data) and provide control symbols. Transmit processor 820 may also generate the primary and secondary synchronization signals and the reference signals for each cell and may provide known symbols for all synchronization and reference signals for all cells in eNB 110. A transmit (TX) multiple-input multiple-output (MIMO) processor 830 may multiplex the data symbols, the control symbols, and the known symbols for the synchronization and reference signals. TX MIMO processor 830 may perform spatial processing (e.g., precoding) on the multiplexed symbols, if applicable, and provide T output symbol streams to T modulators (MODs) 832a through 832t. Each modulator 832 may process a respective output symbol stream (e.g., for OFDM) to obtain an output sample stream. Each modulator 832 may further process (e.g., convert to analog, amplify, filter, and upconvert) the output sample stream to obtain a downlink signal. T downlink signals from modulators 832a through 832t may be transmitted via T antennas 834a through 834t, respectively.

At UE 120, antennas 852a through 852r may receive the downlink signals from eNB 110 and provide received signals to demodulators (DEMODs) 854a through 854r, respectively. Each demodulator 854 may condition (e.g., filter, amplify, downconvert, and digitize) a respective received signal to obtain received samples and may further process the received samples (e.g., for OFDM) to obtain received symbols for different subcarriers. A MIMO detector 856 may obtain received symbols from all R demodulators 854a through 854r, perform MIMO detection on the received symbols if applicable, and provide detected symbols. A receive processor 858 may process (e.g., demodulate, deinterleave, and decode) the detected symbols, provide decoded data for UE 120 to data sink 860, and provide decoded control information to controller/processor 880.

On the uplink, at UE 120, data from a data source 862 and control information (e.g., measurement information comprising TOAs for cells) from controller/processor 880 may be processed by a transmit processor 864, further processed by a TX MIMO processor 866 if applicable, conditioned by modulators 854a through 854r, and transmitted to eNB 110. At eNB 110, the uplink signals from UE 120 may be received by antennas 834, conditioned by demodulators 832, processed by a MIMO detector 836 if applicable, and further processed by a receive processor 838 to obtain the data and control information transmitted by UE 120, to provide decoded data to data sink 839, and to provide decoded control information to controller/processor 840, for example.

Controllers/processors 840 and 880 may direct the operation at eNB 110 and UE 120, respectively. A TOA processor 870 at UE 120 may perform correlation for synchronization signals and/or reference signals from detected cells to obtain TOAs for the cells. Processor 870, processor 880 and/or other modules at UE 120 may perform or direct process 600 in FIG. 6, process 620 in FIG. 7, and/or other processes for the techniques described herein. Memories 842 and 882 may store data and program codes for eNB 110 and UE 120, respectively. A scheduler 844 may schedule UEs for data transmission and may provide assignments of resources for the scheduled UEs.

eLMU 130 in FIG. 1 may be implemented in similar manner as UE 120 in FIG. 8. eLMU 130 may determine TOAs for different cells based on the synchronization signals and/or the reference signals from the cells. eLMU 130 may determine RTDs for different pairs of cells based on the TOAs for the cells, as described above.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a general-purpose processor, a microprocessor, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS), where applicable, typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A mobile station (MS) can refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" can also include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" can include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above can also be considered a "mobile station."

The methodologies described herein may be implemented by various means depending upon the application. For example, these methodologies may be implemented in hardware, firmware, software, or any combination thereof. For an implementation involving hardware, the processors/processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting positioning, comprising:
    receiving a plurality of signals from a transmitter of a plurality of transmitters, the plurality of signals comprising a first signal received on a first set of subcarriers and a second signal received on a second set of subcarriers;
    performing correlation for the first signal to obtain first correlation results for a plurality of time offsets;
    performing correlation for the second signal to obtain second correlation results for the plurality of time offsets; and
    determining a time of arrival (TOA) of the plurality of signals based at least in part on results of combining the first correlation results and the second correlation results.

2. The method of claim 1, wherein the first signal comprises a reference signal sent on the first set of non-contiguous subcarriers, and wherein the second signal comprises a synchronization signal sent on the second set of contiguous subcarriers.

3. The method of claim 2, wherein the first set includes non-contiguous subcarriers distributed across system bandwidth, and wherein the second set includes contiguous subcarriers in a center portion of the system bandwidth.

4. The method of claim 2, wherein the first set includes a configurable number of subcarriers determined by system bandwidth, and wherein the second set includes a fixed number of subcarriers independent of the system bandwidth.

5. The method of claim 1, wherein the first signal comprises a first reference signal sent on the first set of non-contiguous subcarriers, wherein the second signal comprises a second reference signal sent on the second set of non-contiguous subcarriers, and wherein the first and second sets include different subcarriers distributed across system bandwidth.

6. The method of claim 5, wherein the determining the TOA for the transmitter further comprises determining a synchronization signal sent by the transmitter on a third set of contiguous subcarriers.

7. The method of claim 5, wherein the determining the TOA for the transmitter further comprises determining a primary synchronization signal and a secondary synchronization signal sent by the transmitter on a third set of contiguous subcarriers.

8. The method of claim 1, wherein the first and second sets overlap partially, and wherein the first and second sets include at least one subcarrier common to both sets.

9. The method of claim 1, wherein the first and second sets are non-overlapping, with each set including subcarriers not included in the other set.

10. The method of claim 1, wherein the performing correlation for the first signal comprises
    generating a sample sequence with known symbols mapped to the first set of subcarriers used for the first signal, and
    correlating received samples at the receiver with the sample sequence at each time offset to obtain the first correlation results for the plurality of time offsets.

11. The method of claim 1, wherein the combining the first and second correlation results comprises coherently combining the first and second correlation results to obtain the combined correlation results for the transmitter.

12. The method of claim 1, wherein the combining the first and second correlation results comprises
    coherently combining the first and second correlation results for each time interval to obtain intermediate correlation results for the time interval, and
    non-coherently combining the intermediate correlation results across multiple time intervals to obtain the combined correlation results for the transmitter.

13. The method of claim 1, wherein the performing correlation for the first signal from the transmitter comprises
    performing correlation for the first signal for each of multiple portions of a signal bandwidth, and
    non-coherently combining correlation results for the multiple portions of the signal bandwidth to obtain the first correlation results.

14. The method of claim 1, wherein the combining the first and second correlation results comprises
    coherently combining the first and second correlation results for each antenna at the transmitter to obtain intermediate correlation results for the antenna, and
    non-coherently combining the intermediate correlation results across multiple antennas at the transmitter to obtain the combined correlation results for the transmitter.

15. The method of claim 1, wherein the determining the TOA based on the combined correlation results comprises
identifying an earliest time offset with a combined correlation result exceeding a threshold, and
determining the TOA based on the identified time offset.

16. The method of claim 1, wherein the determining the TOA based on the combined correlation results comprises
identifying an earliest time offset with a combined correlation result exceeding a threshold,
performing interpolation on at least two combined correlation results, including the combined correlation result for the identified time offset, to obtain an interpolated time offset, and
determining the TOA based on the interpolated time offset.

17. The method of claim 16, wherein the determining the TOA based on the interpolated time offset comprises determining the TOA based further on an adjustment to account for known biases between a transmitted pulse shape and an interpolating function.

18. The method of claim 1, further comprising:
determining observed time difference of arrivals (OTDOAs) for multiple pairs of transmitters of the plurality of transmitters, one OTDOA for each pair of transmitters, each OTDOA being determined based on the TOA for each transmitter in the corresponding pair, and
wherein a location estimate for the receiver is determined based on the OTDOAs for the multiple pairs of transmitters.

19. The method of claim 1, further comprising:
computing a location estimate for the receiver based at least in part on the TOA of each transmitter and a known location of each transmitter.

20. The method of claim 19, further comprising:
receiving assistance data for the plurality of transmitters, and wherein the location estimate for the receiver is computed using the assistance data.

21. The method of claim 1, further comprising:
transmitting measurement information comprising TOAs for the plurality of transmitters to a network entity; and
receiving a location estimate for the receiver from the network entity, the location estimate being determined based on the TOAs for the plurality of transmitters.

22. The method of claim 1, further comprising:
determining relative time differences (RTDs) for multiple pairs of transmitters of the plurality of transmitters, one RTD for each pair of transmitters, each RTD being determined based at least in part on the TOA of each transmitter and a known location of each transmitter in the corresponding pair and a known location of a receiver.

23. The method of claim 1, further comprising:
receiving assistance data for the plurality of transmitters, and wherein TOAs for the multiple transmitters are determined using the assistance data.

24. The method of claim 23, wherein each transmitter is associated with a cell of a plurality of cells, and wherein the assistance data comprises a cell identity (ID) of each cell, a location of each cell, carrier frequency information for each cell, cyclic prefix length for each cell, number of transmit antenna for each cell, relative time differences (RTDs) for each cell, a search window size, or a combination thereof.

25. An apparatus for supporting positioning, comprising:
means for receiving a plurality of signals from a transmitter of a plurality of transmitters, the plurality of signals comprising a first signal received on a first set of subcarriers and a second signal received on a second set of subcarriers;
means for performing correlation for the first signal to obtain first correlation results for a plurality of time offsets;
means for performing correlation for the second signal to obtain second correlation results for the plurality of time offsets; and
means for determining a time of arrival (TOA) of the plurality of signals based at least in part on results of combining the first correlation results and the second correlation results.

26. The apparatus of claim 25, wherein the first signal comprises a reference signal sent on the first set of non-contiguous subcarriers, and wherein the second signal comprises a synchronization signal sent on the second set of contiguous subcarriers.

27. The apparatus of claim 25, wherein the first signal comprises a first reference signal sent on the first set of non-contiguous subcarriers, wherein the second signal comprises a second reference signal sent on the second set of non-contiguous subcarriers, and wherein the first and second sets include different subcarriers distributed across system bandwidth.

28. The apparatus of claim 25, wherein the means for combining the first and second correlation results comprises
means for coherently combining the first and second correlation results for each time interval to obtain intermediate correlation results for the time interval, and
means for non-coherently combining the intermediate correlation results across multiple time intervals to obtain the combined correlation results for the transmitter.

29. The apparatus of claim 25, wherein the means for combining the first and second correlation results comprises
means for coherently combining the first and second correlation results for each antenna at the transmitter to obtain intermediate correlation results for the antenna, and
means for non-coherently combining the intermediate correlation results across multiple antennas at the transmitter to obtain the combined correlation results for the transmitter.

30. An apparatus for supporting positioning, comprising:
at least one processor configured:
to receive a plurality of signals from a transmitter of a plurality of transmitters, the plurality of signals comprising a first signal received on a first set of subcarriers and a second signal received on a second set of subcarriers,
to perform correlation for the first signal to obtain first correlation results for a plurality of time offsets;
to perform correlation for the second signal to obtain second correlation results for the plurality of time offsets; and
to determine a time of arrival (TOA) of the plurality of signals based at least in part on results of combining the first correlation results and the second correlation results.

31. The apparatus of claim 30, wherein the first signal comprises a reference signal sent on the first set of non-contiguous subcarriers, and wherein the second signal comprises a synchronization signal sent on the second set of contiguous subcarriers.

32. The apparatus of claim 30, wherein the first signal comprises a first reference signal sent on the first set of non-contiguous subcarriers, wherein the second signal comprises a second reference signal sent on the second set of non-contiguous subcarriers, and wherein the first and second sets include different subcarriers distributed across system bandwidth.

33. The apparatus of claim 30, wherein the at least one processor is further configured:
- to coherently combine the first and second correlation results for each time interval to obtain intermediate correlation results for the time interval, and
- to non-coherently combine the intermediate correlation results across multiple time intervals to obtain the combined correlation results for the transmitter.

34. The apparatus of claim 30, wherein the at least one processor is further configured:
- to coherently combine the first and second correlation results for each antenna at the transmitter to obtain intermediate correlation results for each antenna, and
- to non-coherently combine the intermediate correlation results across multiple antennas at the transmitter to obtain the combined correlation results for the transmitter.

35. A computer program product, comprising:
a non-transitory computer-readable medium comprising:
- code to cause at least one processor to receive a plurality of signals from a transmitter of a plurality of transmitters, the plurality of signals comprising a first signal received on a first set of subcarriers and a second signal received on a second set of subcarriers,
- code to cause the at least one processor to perform correlation for the first signal to obtain first correlation results for a plurality of time offsets;
- code to cause the at least one processor to perform correlation for the second signal to obtain second correlation results for the plurality of time offsets; and
- code to cause the at least one processor to determine a time of arrival (TOA) of the plurality of signals based at least in part on results of combining the first correlation results and the second correlation results.

* * * * *